US008130701B2

(12) United States Patent
Fong

(10) Patent No.: US 8,130,701 B2
(45) Date of Patent: *Mar. 6, 2012

(54) SYSTEM, COMPUTER PROGRAM PRODUCT AND METHOD FOR ACCESSING A LOCAL NETWORK OF ELECTRONIC DEVICES

(75) Inventor: Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 1101 days.

This patent is subject to a terminal disclaimer.

(21) Appl. No.: 11/961,155

(22) Filed: Dec. 20, 2007

(65) Prior Publication Data

US 2008/0095128 A1    Apr. 24, 2008

Related U.S. Application Data

(63) Continuation of application No. 10/347,615, filed on Jan. 22, 2003, now Pat. No. 7,327,701.

(51) Int. Cl.
*H04W 4/00* (2009.01)

(52) U.S. Cl. ........................... 370/328; 370/349

(58) Field of Classification Search .................. 370/328, 370/349, 310.2, 338, 342
See application file for complete search history.

(56) References Cited

U.S. PATENT DOCUMENTS

| 5,519,706 A | 5/1996 | Bantz et al. ............... 455/435.2 |
| 5,870,385 A * | 2/1999 | Ahmadi et al. ............... 370/252 |
| 7,327,701 B2 * | 2/2008 | Fong .............................. 370/328 |
| 2003/0023704 A1 * | 1/2003 | Lee et al. ...................... 709/217 |
| 2003/0126039 A1 * | 7/2003 | Kiyose et al. ................... 705/26 |

* cited by examiner

*Primary Examiner* — Brenda H Pham
(74) *Attorney, Agent, or Firm* — Oblon, Spivak, McClelland, Maier & Neustadt, L.L.P.

(57) ABSTRACT

A method of managing electronic devices includes providing a main server including software for managing network resources from a single point of administration, receiving at the main server wireless data packets from a plurality of wireless electronic devices, and determining a registered device among the plurality of wireless electronic devices. The registered device is then wirelessly connecting to the main server to create a wireless local area network (LAN), and is managed using the software. The registered device may be an appliance, an environmental control device, or an entertainment device and the LAN may be a home or office LAN.

5 Claims, 20 Drawing Sheets

SYSTEM, COMPUTER PROGRAM PRODUCT AND METHOD FOR ACCESSING A LOCAL NETWORK OF ELECTRONIC DEVICES

This continuation application is based upon and claims the benefit of priority under 35 U.S.C. §120 for application Ser. No. 10/347,615 (the parent application), filed Jan. 22, 2003 now U.S. Pat. No. 7,327,701. The entire content of the parent application is incorporated herein by reference.

BACKGROUND OF THE INVENTION

1. Field of the Invention

The present invention is directed to methods, computer-based systems and computer program products for accessing a network, and in particular accessing a local network of electronic devices.

2. Discussion of the Background

The past few decades have witnessed the ever-increasing pervasiveness of electronic and computer equipment in our work and home lives. From home entertainment systems to office equipment, the modern home and workplace includes a vast array of electronic devices. Moreover, traditional electrical devices such as refrigerators and ordinary lighting units have become sophisticated microprocessor controlled devices.

With such a large number of sophisticated electronic devices in our home and workplace, there has been recognized a need to manage such equipment. For example, the Open Services Gateway Initiative (OSGI) is an industry initiative to provide the technology to allow management of localized electronics equipment by use of an external service provider. The initiative contemplates a service provider, located on a wide area network such as the Internet, providing management services for the localized electronic devices through a "gateway" into the home or workplace that the devices are located in. However, given the current state of computer security, users may be unwilling to open control of such fundamental necessities such as security and climate control to the control of a virtual entity on the Internet. Moreover, comprehensive control of one's electronic environment may require wiring many devices to a central computer which is expensive and restricts the mobility of the devices.

In addition to the need to manage the large number of sophisticated devices in the home or office, the diversity of such devices makes it difficult for users to manually control the settings of these devices. For example, while most microprocessor based devices are set up and manually controlled by way of a menu driven interface, the menu organization and terminology varies greatly among electronic devices. Indeed, one must spend a great deal of time reading setup and control instructions for each device in the home or workplace in order to optimize the features and conveniences of these device. This is both a burden and a bother to users.

In addition to the burden of learning the control features of each electronic device, many devices are not provided with a remote controller thereby requiring the user to input commands to each device locally. Those devices that do have remote control such as televisions, VCRs, and ceiling fans have traditionally used an infrared transceiver on the remote control device and the device to be controlled. However, such control devices require line of sight infrared communications which is not suitable for controlling wireless network devices that are scattered throughout various rooms of a household or office. Moreover, traditional remote control devices are often complex devices that include a large number of buttons associated with functional controls for the device to be controlled.

SUMMARY OF THE INVENTION

An object of the present invention is to provide a method, system, and computer readable medium for locally managing electronic devices in the home or workplace.

Another object of the present invention is to provide a method, system, and computer readable medium for sharing the resources of a main server that manages a variety of electronic devices.

Yet another object of the present invention is to provide a method, system, and computer readable medium for reliably and securely accessing the resources of a wireless LAN.

These and other objectives of the present invention are met by a method, system, and computer program product for managing electronic devices. The method on which the system and computer program product are based includes providing a main server including software for managing network resources from a single point of administration, receiving at the main server wireless data packets from a plurality of wireless electronic devices, and determining a registered device among the plurality of wireless electronic devices. The registered device is then wirelessly connecting to the main server to create a wireless local area network (LAN), and is managed using the software. The registered device may be an appliance, an environmental control device, or an entertainment device.

The main server may be a desktop computer or a portable computer and the step of determining may include determining a registered device based on a general characteristic of the wireless data packet received from the registered device, or based on a unique identifier of the registered device that is included in the wireless data packet received from the registered device. Where a general characteristic is used, determining the registered device includes identifying a transmit frequency, encryption method or identifier of the wireless data packet, and determining if the transmit frequency, encryption method or identifier is a common to all registered devices on the wireless LAN. Where a unique identifier is used, determining the registered device includes identifying a transmit frequency or encryption key of the wireless data packet, and comparing the transmit frequency or encryption key to a network device list to determine if the frequency is associated with a registered device.

The electronic devices may be managed by monitoring management initiating parameters for the electronic devices, determining a management action to be performed on an electronic device to be managed based on the management initiating parameters, and then transmitting a management action data packet to the electronic device to be managed. The management initiating parameters may be monitored by monitoring at least one of a system clock and sensed parameters. The electronic device to be managed may receive the management action data packet and then perform the management action at the electronic device to be managed based on the management action data packet.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
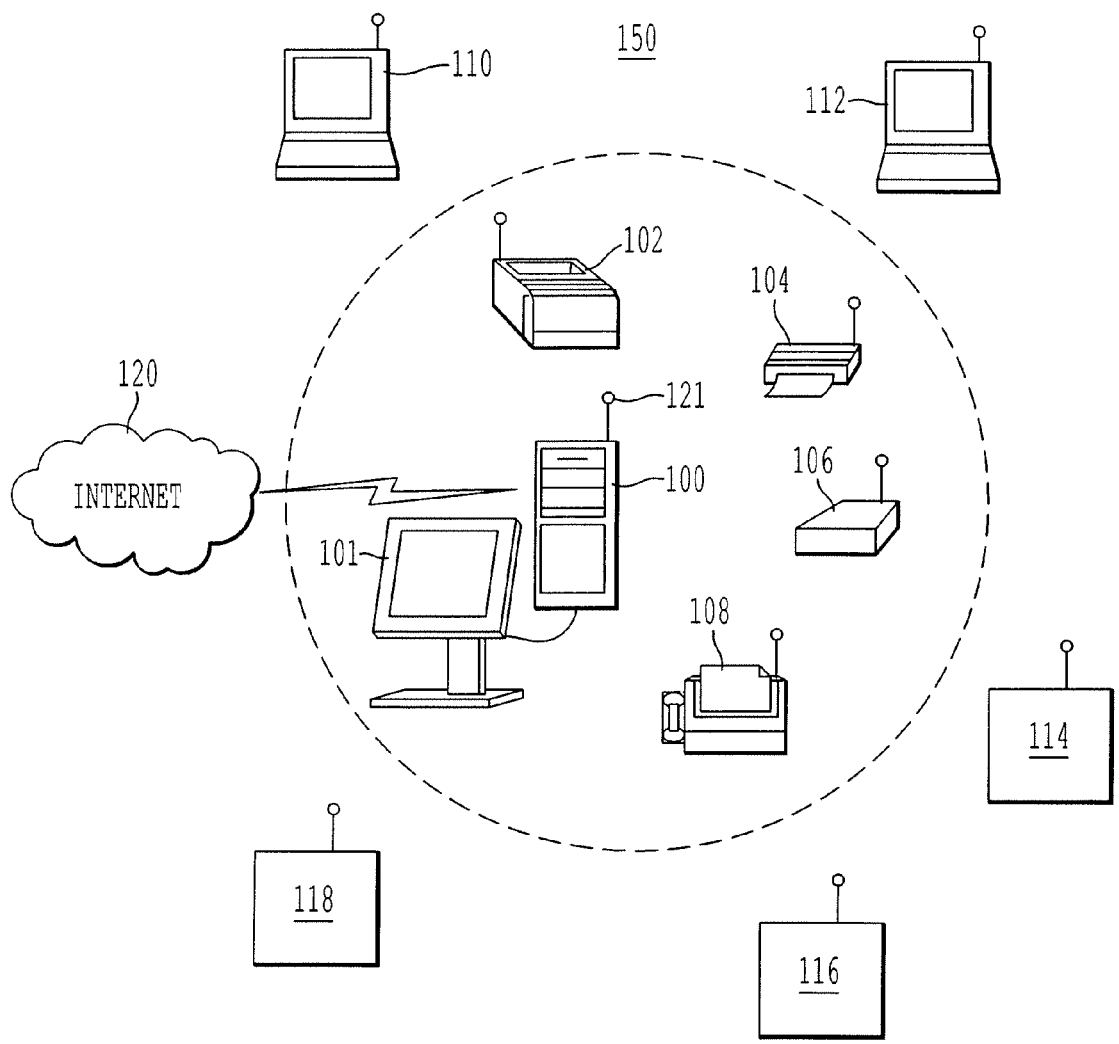
FIG. 1 is a system diagram illustrating a system for managing and controlling a local network of electronic devices in accordance with an embodiment of the present invention.

Referring now to the drawings, wherein like reference numerals designate identical or corresponding parts throughout the several views, FIG. 1 is a system diagram illustrating a system for managing and controlling a local network 150 of electronic devices. The system includes a main server 100 having a display 101, and office equipment including printers 102 and 104, scanner 106, and fax machine 108. The system also includes mobile terminals 110 and 112, entertainment device 114, appliance 116, and environmental control devices 118. As seen in FIG. 1, each of the devices 100-118 include an antenna represented by the symbol numbered as 121 on the main server 100. In addition, one or all of the devices 100-118 may be provided with access to the Internet 120 as will be further described below.

The main server 100 is any suitable workstation, desktop computer or other suitable network node for providing the management of computer and networking resources from a single point of administration. The main server includes a wireless transceiver device that allows the main server 100 to transfer files and other data to the other wireless electronic equipment 102-118 by way of antenna 121. Thus, the main server 100 provides a server function in a wireless local area network (LAN) including the electronic equipment 102-118 of FIG. 1 as clients. The LAN may be a bus, hub, or any other network type and may contain a firewall (not shown). A firewall is a hardware device or software that allows only authorized computers on one side of the firewall to connect to a network or computer on the other side of the firewall. Firewalls are known and commercially available devices or software (e.g., SunScreen and Firewall 1 from Sun Microsystems, Inc.).

Figure 20:
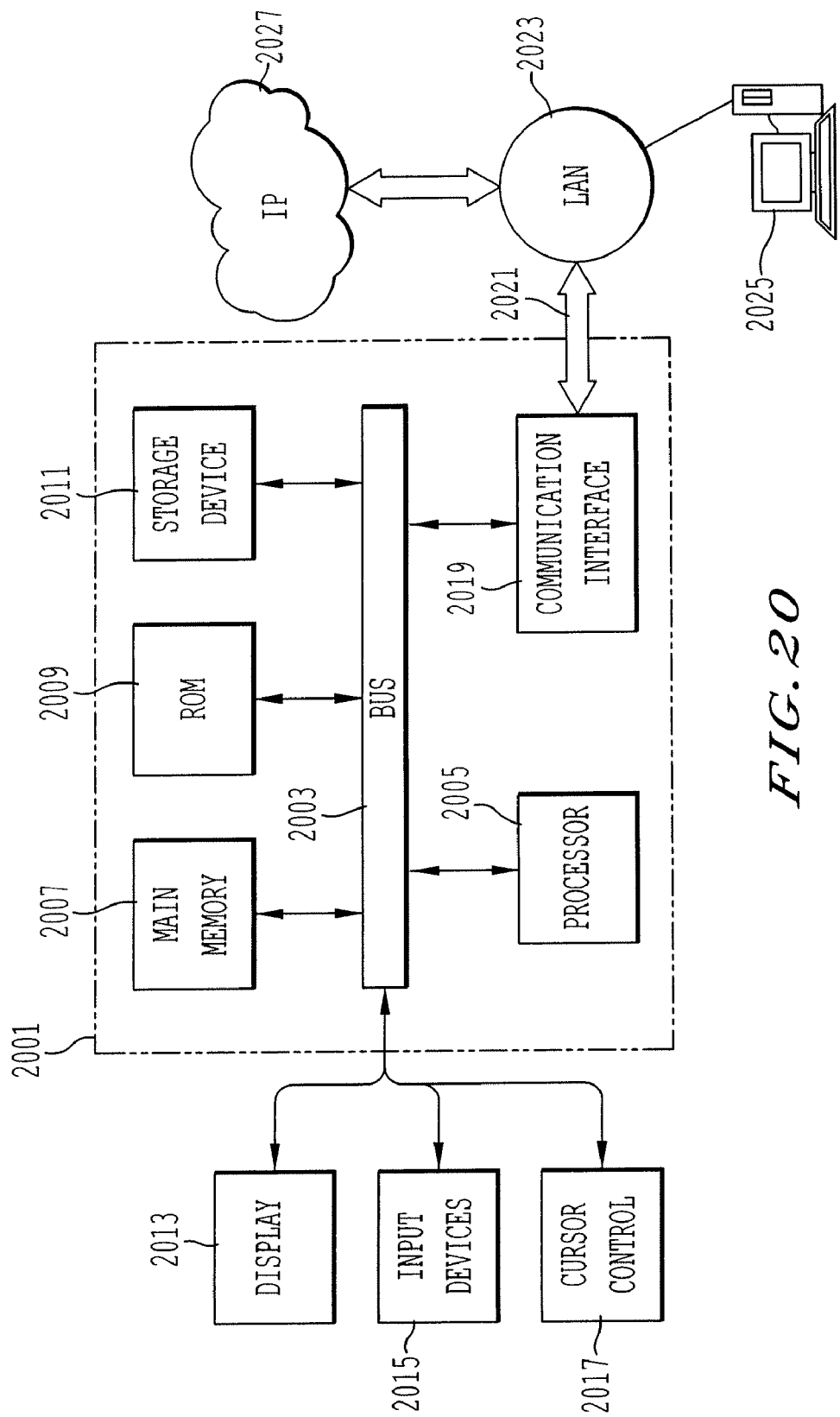
FIG. 20 illustrates a general purpose computer system upon which an embodiment according to the present invention may be implemented.

The main server 100 may be implemented using a general purpose computer, such as the computer of FIG. 20, that includes network operating system (NOS) software such as windows NT, Unix, Linux, or Novell Netware. The main server 100 may include a login server application such as Novell Directory Services ("NDS"), which is a product for managing access to computer networks. Using NDS, a network administrator can set up and control a database of users and manage them using a directory with a graphical user interface. Using NDS, or the main server 100, users of computers and other devices at remote locations can be added, updated, and managed centrally. The login operation to the network is typically controlled by a script, which is executed or interpreted. As an alternative to Novell Directory Services, Microsoft's Active Directory may be utilized as a directory service. Moreover, any suitable software and/or hardware may be utilized to assist in controlling access to and management of the network resources.

The main server 100 may also include file server, e-mail server, and Internet server applications if desired. The filer server application allows files contained on the main server 100 to be accessed by devices 102-118. The email server may be utilized to manage and control email accounts on the network and permit the sending and receiving of Internet email via Internet 120. The Internet server allows access to the Internet 120. If desired, the Internet server may be utilized to allow browsing of the World Wide Web, can allow file transfers using the File Transfer Protocol, and may allow the transmission and receipt of Internet electronic mail messages from suitable network nodes such as the mobile terminals 110 and 112.

In addition to the server applications described above, the main server 100 includes management and control applications for managing and controlling each of the devices connected to the main server 100, and in particular the entertainment device 114, the appliance 116, and the environmental device 118. For example, the main server 100 may include software for automatically controlling a thermostat or for providing a uniform means of manually controlling each of the electronic devices on the wireless LAN 150 as will be further described below.

The office equipment of the LAN 150 is signified by the dashed circle in FIG. 1 and provides all of the functions of conventional equipment that may be associated with a home or workplace office. For example, printers 102 and 104 may be implemented as an impact or non-impact printing device for printing text and images on a printing medium. Similarly, scanner 106 and fax machine 108 may provide conventional optical scanning and facsimile transmission functions respectfully. Despite these conventional functions, the printers 102 and 104, the scanner 106, and the fax machine 108 of the present invention are provided with a wireless transceiver suitable for communicating with the main server 100 via their respective antennas. In this regard, special server applications such as a print server may be provided on the main server 100 to allow all terminals on the network to share the printers 102 and 104, and office equipment in general.

Mobile terminals 110 and 112 function as mobile computer terminals having a transceiver that allows wireless access to the main server 100. The terminals are preferably dumb terminals having only the minimum hardware needed to access the main server 100, but may be thin or fat clients having the local hardware devices needed for independent operation, depending on the user needs. Thus, each mobile terminal 110 and 112 utilizes the resources of the main terminal 100. For example, either of the terminals 110 and 112 can use the printer 102, printer 104, scanner 106, or fax machine 108. Similarly, the terminals 110 and 112 can access files and software applications stored on the local storage of the main server 100. Since the terminals have wireless access and share the resources of the main server 100, they can be easily moved to any location that is within the area of coverage of the wireless LAN 150. In a preferred embodiment, this area of coverage can be adjusted to a desired size as will be further described below.

Entertainment device 114 may be any one of a variety of electronic devices used for providing entertainment to a user. For example, entertainment device 114 may be a television, stereo, video game, video cassette recorder (VCR), digital video disk (DVD) player, compact disk (CD) player or any other electronic device for entertaining the user. While the functionality of these devices is well known in the art, the entertainment device 114 of the present invention is provided with a transceiver suitable for allowing wireless communication with the main server 100 by way of antenna 121. Thus, entertainment device 114 is connected to the wireless LAN 150. In one embodiment of the present invention, the main server 100 contains software for managing and controlling the entertainment device as will be described below.

Appliance 116 represents an electronic device for performing some physical work for the user of the appliance. The appliance 116 may be a dishwasher, coffee maker, refrigerator, a clothes washer or dryer, or any other similar device. The appliance 116 is also equipped with a transceiver for providing wireless communication with the main server 100 via antenna 121 and is therefore connected to LAN 150. As with the entertainment device 114, the appliance 116 may be managed and controlled by the main server 100.

Environmental control device 118 represents those electronic devices found in the home or workplace, which control the environment of such areas. For example, environmental control device 118 may be a thermostat for controlling the heat and air conditioning of a home or building, a lighting unit, a ceiling fan, an attic fan or other exhaust unit, a humidity control unit, or similar device. As with the other devices in FIG. 1, the environmental control unit 118 is provided with a transceiver for allowing wireless communication via antenna 121 and in therefore connected to wireless LAN 150.

As noted above, the coverage area of the wireless LAN 150 may be set to a predetermined range. Specifically, in a preferred embodiment, the transceiver of the main server 100 includes an adjustable signal strength feature. By adjusting the output power of the main server 100, a user controls the range at which the network nodes (i.e. the electronic devices) can be placed and still be able to communicate with the main server 100 to maintain a network connection and share the resources of the main server 100. In this regard, the transceivers of electronic devices 102-118 may also include an adjustable transmit power feature. In a preferred embodiment, the electronic devices 102-118 have an automatic adjustment feature that adjusts the transmit power based on a detected signal strength of signals transmitted from the main server 100. Any known method or device for detecting signal strength may be used to implement this feature of the present invention.

Figure 2:
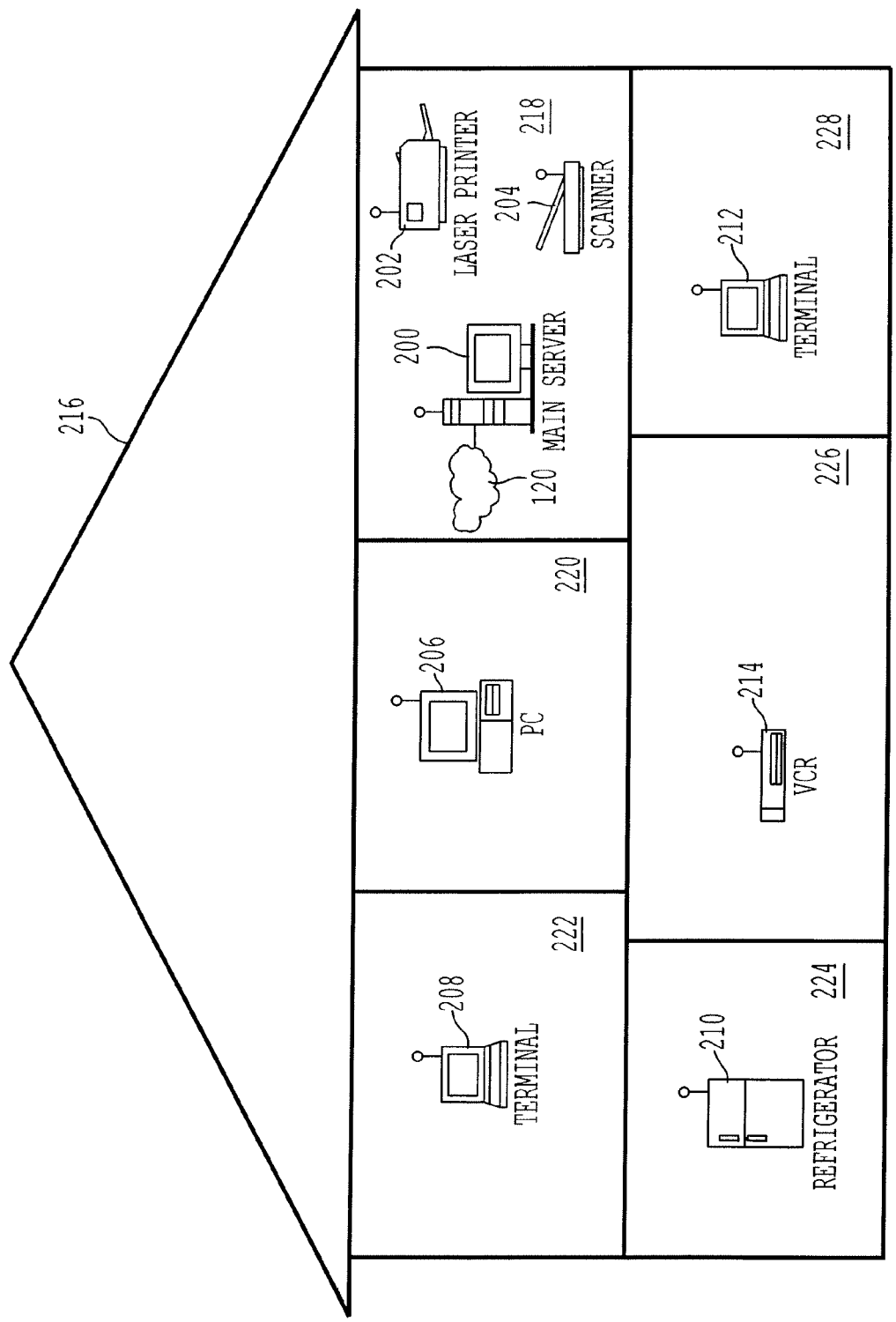
FIG. 2 is an illustration of the wireless LAN of the present invention implemented in a home environment.

As mentioned, the wireless network of FIG. 1 may be applied to a home or workplace environment. FIG. 2 is an illustration of the wireless LAN of the present invention implemented in a home environment. As seen in this figure, home 216 includes rooms 218, 220, 222, 224, 226, and 228 separated by walls or other physical structures. Room 218 of the home 216 contains a main server 200, a laser printer 202, and a scanner 204 and, thus, may serve as a home office. The main server 200 is depicted as a desktop computer with limited portability, but may be implemented as any general purpose computer such as the computer of FIG. 15. Moreover, the main server 200 may be connected to the Internet 120. Room 220 includes a desktop computer 206, while rooms 222 and 228 include mobile terminals 208 and 212 respectively. As with the mobile terminals of FIG. 1, the mobile terminals 208 and 212 are preferably dumb terminals, which provide the light weight and small size desirable for increased portability. Room 224 includes refrigerator 210 and room 226 includes VCR 214.

As with the system of FIG. 1, the devices in FIG. 2 each include an antenna that allows connection of the respective electronic device to a wireless network controlled by server 200. Thus, while the laser printer 202 and the scanner 204 are shown in room 218, these devices may be placed in any other room in the home 216 and still maintain communication with the main server 200. Moreover, the transmit power of the wireless devices of FIG. 2 may be adjustable to control the range of coverage of the network. As each device of FIG. 2 is connected to a wireless LAN controlled by main server 200, each electronic device of FIG. 2 can share the resources of the main server 200. In addition, the main server 200 includes software for managing and controlling the electronic devices on the home wireless network of FIG. 2.

Figure 3:
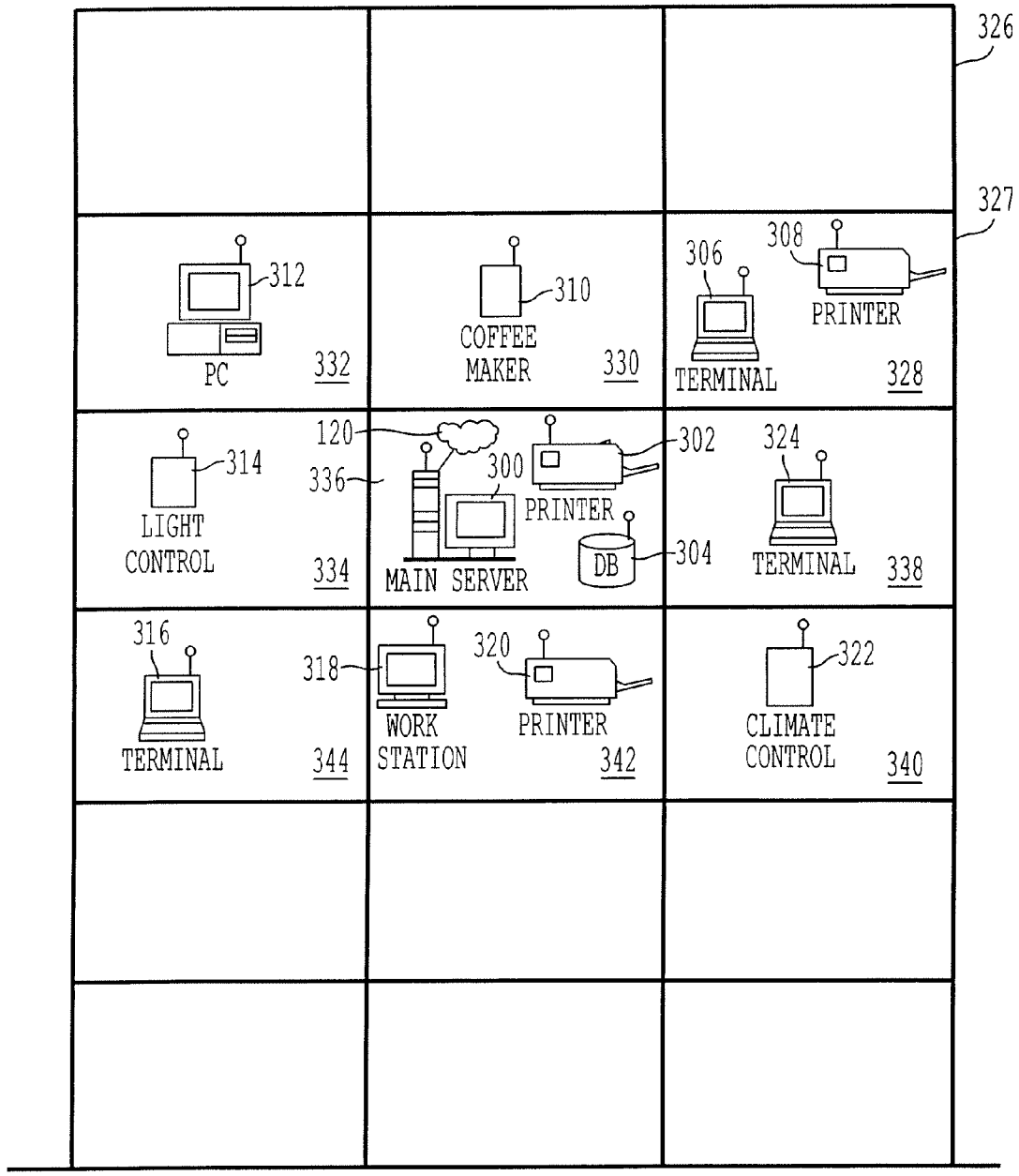
FIG. 3 is an illustration of the wireless LAN of the present invention implemented in a workplace environment.

FIG. 3 is an illustration of the wireless LAN of the present invention implemented in a workplace environment. The workplace 327 is in an office building 326 and includes rooms 328, 330, 332, 334, 336, 338, 340, 342, and 344 separated by a wall or other physical structure. Room 336 contains a main server 300, printer 302, and database 304 with main server 300 connected to Internet 120. The main server 300 and printer 302 are similar to their respective devices described in FIGS. 1 and 2. The database 304 is a file that contains records for carrying out the business of the workplace 327. Rooms 328, 338, and 344 include mobile terminals 306, 324, and 316 respectively, with room 328 also containing a printer 308. Room 332 includes a desktop computer 312 and room 342 includes a workstation 318 and printer 320. The workstation 318 is similar to the mobile terminals in that it depends largely on the hardware of the main terminal 300 for operation, however the workstation 318 may include a relatively large monitor suitable for displaying graphic and other special purpose software applications provided by the main server 300.

In addition to the office equipment described above, the workplace 327 also includes a coffee maker 310 in room 330, a lighting control unit 314 in room 334, and a climate control unit 322 in room 340. The coffee maker 310 is preferably provided with a timing device for brewing coffee at a predetermined time and includes a transceiver for communicating with the main server 300 via antenna 321. The lighting control device 314 is a unit for controlling the lighting of the workplace and also includes a timer for automatically activating the lighting at predetermined times. While the lighting control 314 is shown as a single unit located in room 334, it is to be understood that the lighting control can be implemented as a plurality of wireless units located on individual lights throughout the workplace 327. Finally, the climate control 322 is a wireless device that controls temperature and other environmental factors within the workplace. As with the lighting control, the climate control may be implemented as a plurality of wireless units located on individual environmental units throughout the workplace 327.

As seen in FIG. 3, only a portion of the rooms available in the office building 326 make up the workplace area for the wireless network. In one embodiment, the main server 300 emits an omnidirectional wireless communication signal and is therefore centrally located in the workplace so that the output power of the main server 300 covers an area substantially corresponding to the periphery of the workplace 327. In this regard, the transmit power of the main server 100 is preferably adjustable to cover a larger area of the building 326 should the workplace area be expanded. As previously described, the output power levels of the other (i.e. client) wireless electronic devices of FIG. 3 may also be adjustable.

It is to be understood that the system in FIGS. 1-3 are for exemplary purposes only, as many variations of the specific hardware and software used to implement the present invention will be readily apparent to one having ordinary skill in the art. For example, the functionality of the main server 100 may be divided among several computers. Moreover, while the systems are described as a client server network in which the main server 100 serves as the central server, the system may operate as a peer to peer network in which the mobile terminals and other desktop computers in the system act as both servers and clients to other nodes on the network. Finally, it is to be understood that the electronic devices connected to the LANs of FIGS. 1-3 are exemplary only and the present invention contemplates that any electronic devices may be connected to a LAN to realize the benefits and advantages of the present invention.

Figure 4:
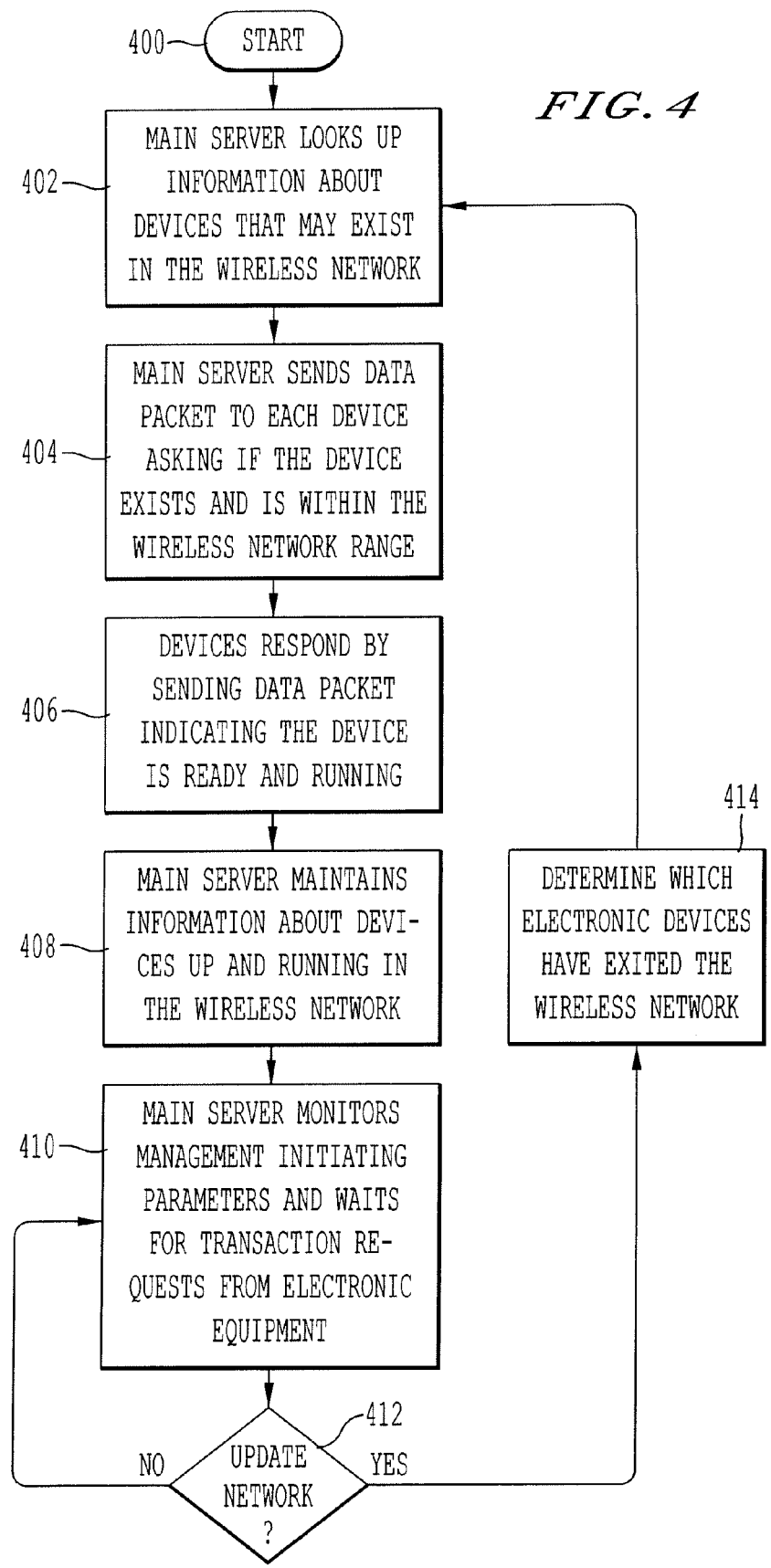
FIG. 4 is a flow chart illustrating an exemplary start up of a main server to establish a wireless LAN in accordance with an embodiment of the present invention.

FIG. 4 shows the flow diagram of an exemplary start up of a main server and establishment of a wireless LAN in accordance with the present invention. The process steps of FIG. 4 will be described with respect to the wireless network 150 of FIG. 1. As discussed above, each of the electronic devices of FIG. 1 includes an antenna for wireless communication. Thus, for all of the steps of FIG. 4 in which the data packets are sent between the different devices, the data packets are sent wirelessly. The data packets may also be encrypted for secure transmission.

Step 400 illustrates the starting up of the system when a user turns on the main server 100. When the main server 100 is turned on, the main server must identify all of the electronic devices that are powered up and capable of connecting with the wireless LAN 150. In step 402, the main server 100 looks up information that it stores about all of the electronic devices that can exist in the wireless network 150. In one embodiment, the stored list is input by a user of the LAN 150 as wireless devices are added to the LAN. In step 404, the main server 100 sends data packets to each of the electronic devices identified in step 402 to determine which electronic devices actually exist in the range of the wireless network 150. The data packets of step 404 may, for example, include the unique identifiers accessed in step 402 so that each electronic device can determine that it is being contacted by the main server 100.

In step 406, each of the electronic devices that is powered up and within the range of the wireless network 150 responds to the request made by the main server 100 in step 406. Each electronic device sends data packets to the main server 100 that include data indicating that the device is up and running. Of course, only those electronic devices that are within the signal range of the main server 100 and which have sufficient output power to communicate with the main server 100 can send a reply to the main server 100. Once the main server 100 has information about the status of each electronic device and terminal, in step 408, the main server 100 maintains information about the electronic devices powered-up and running in the wireless LAN 150. Then in step 410, the main server 100 monitors management initiating parameters and waits for transaction requests from the electronic devices connected to the wireless LAN 150. The process of monitoring management initiating parameters and responding to transaction requests will be further described with respect to FIGS. 5 and 6 below.

In a preferred embodiment, the main server 100 periodically updates information on the electronic devices connected to the LAN 150. This updating is preferably performed at predetermined time intervals, but may be triggered by some event other than timing. Thus, decision block 412 determines whether the network 150 is to be updated. If the main server 100 is not triggered to update the network, then the main server 100 returns to step 410 where it continues to monitor electronic equipment and wait for transaction requests. If the network is to be updated, the main server 100 proceeds to step 414 and then returns to step 402 as shown in FIG. 4.

In step 414, the main server 100 determines which electronic devices have exited the network and drops links to those devices. A device exits the network 150, for example, when power to the remote device is turned off or the device leaves the signal area of the local device. As used herein, the term "signal area" means that area in which the electronic device can receive, at a predetermined bit error rate, the transmitted signal from the main server 100 and in which the main server 100 can receive the transmit power of the remote device. A determination of whether an electronic device has left the network may be made by the main server 100 monitoring synchronization information of the electronic device, or by the main server 100 receiving an exit message transmitted from an electronic device prior to that device exiting the network. Moreover, as indicated above, the main server 100 may monitor signal strength of remote electronic devices and determine that a particular device has exited the network if the signal strength for that devices drops below a predetermined threshold which may be programmable by the user of the main server 100. In any situation where a remote device has exited the network 150, the main server 100 terminates any link to that device. After dropping electronic devices that have exited the network, the main server 100 returns to steps 402-408 where the main server identifies new devices that may have entered the network area and maintains a list of such devices. An electronic device enters the network 150, for example, when power to the electronic device is on and the device is within the signal area of the main server 100.

Thus, FIG. 4 indicates a process for start up of a main server 100 and establishment of wireless network 150. This process may be performed by using a media access control (MAC) protocol. The MAC protocol is a protocol used on multiple access links to ensure that only one device has access to the shared link at any one time. The MAC protocol, in effect, allocates talking time to each device on the network. For example, the MAC protocol typically divides a single data frame into several time slots. Each device in the network transmits information in a particular time slot and listens in all other time slots of the frame. As each device has a fixed amount of bandwidth, that is, a fixed number of data bits which can be transmitter per second, under the MAC protocol, a fixed amount of data can be transmitted in the device's time slot. A common MAC protocol used for wireless bridges is the Carrier Sense Multiple Access with Collision Avoidance (CSMA/CA). Different MAC protocols may perform the steps of FIG. 4 in different ways. For example, in one embodiment of the present invention, the MAC protocol of the main server 100 updates the network by periodically causing the main server to transmit a "join message" requesting new electronic devices to join into the network. In another embodiment, the MAC protocol transmits a join message and establishes a new link only if prompted by a new remote electronic device to do so. In yet another embodiment, the main server 100 keeps a count of the number of remote electronic devices for which a network link has been established, and the MAC protocol transmits a join message only if the count does not exceed a maximum number. The maximum number may be based on the bandwidth limitations of the main server 100 or programmable by the user of the main server.

Examples of multiple access protocols may be found in the IEEE 802.11 standard, final draft approved Jun. 26, 1997, and the Blue tooth specification "Specification of the Blue Tooth System", V.1.OB, Dec. 1, 1999, core specification—Vol. 1, the entire contents of which are incorporated herein by reference. It is to be understood that the features and benefits of the present invention do not depend on a particular MAC protocol and any of the above named protocols or any other MAC protocol may be used to practice the present invention as will be understood to one of ordinary skill in the art.

Figure 5:
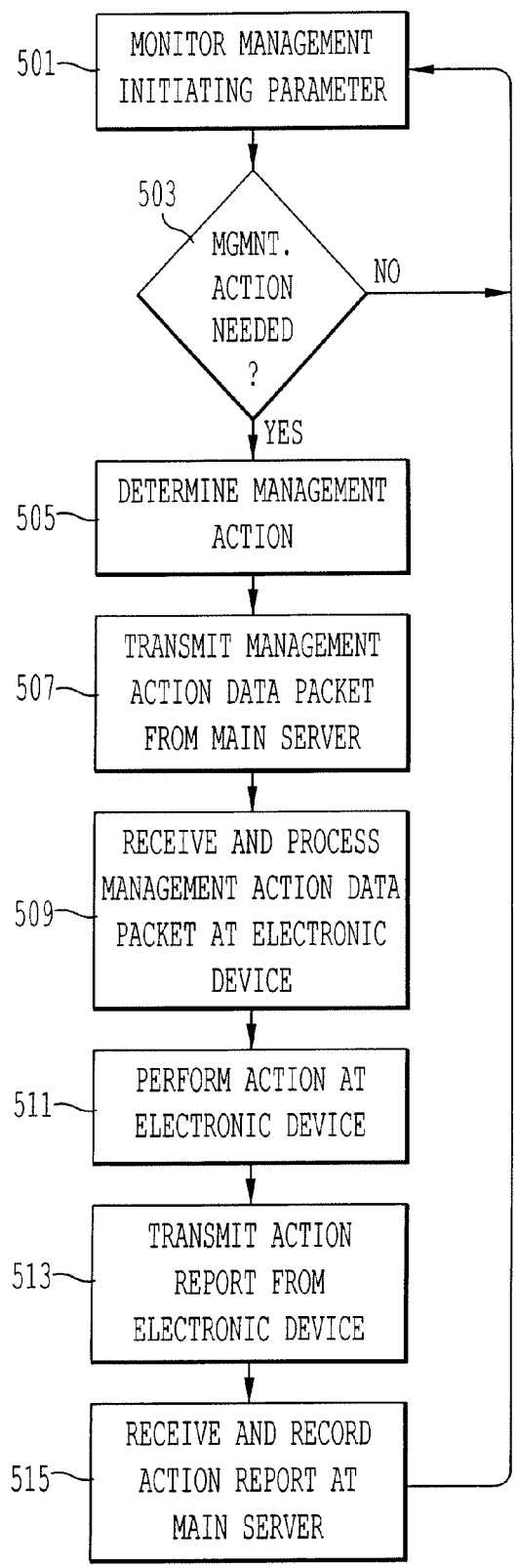
FIG. 5 is a flow chart illustrating a process for managing the electronic devices of a wireless home LAN according to one embodiment of the present invention.

As indicated in the discussion of step 410 of FIG. 4, a main server of the present invention monitors electronic equipment and waits for transaction requests from all electronic devices on the wireless network established by the main server. In a preferred embodiment, a main server manages electronic devices within a wireless home network such as the network described with regard to FIG. 2. FIG. 5 is a flow chart illustrating a process for managing the electronic devices of the wireless LAN in FIG. 2 according to one embodiment of the present invention.

In step 501, the main server 200 monitors the management initiating parameters of all electronic devices 202-212 connected to the wireless LAN. The management initiating parameter is a variable parameter that determines when a particular device will be managed or automatically controlled. For example, the management initiating parameter may be the time of a system clock, a counter that counts a time lapse, or sensor data indicating temperature, humidity, or some other measurable parameter. In decision block 503, the main server 200 determines whether the parameters monitored indicate that a management action is needed. Decision block 403 is performed by comparison of monitored parameters with at least one stored predetermined value for each management initiating parameter. For example, if the management initiating parameter is time, then the main server compares the actual time of an internal system clock with a stored time input by a user; where a match in these times exists, the main server 200 determines that some management action is needed.

If no parameter monitored indicates that an action is needed, the main server 200 returns to step 501 as shown in FIG. 5. If a management parameter indicates that a management action is needed, then the main server 200 proceeds to step 505 where the management action is determined. The management action is a predetermined action associated with the parameter monitored by the main server 200. For example, if the main server 200 is set up to turn on VCR 214 at 2:30 AM, the management parameter is the time of day and the management action is turning on the VCR 214. As another example, if the main server 200 is set up to monitor the battery power of mobile terminals 208 and 212 and send a message to all terminals indicating that a particular terminal battery must be charged, the management initiating parameter is the battery power and the action is sending a message to all terminals on the wireless network. Thus, a management initiating parameter and management action may be associated with any electronic device in the wireless network.

After the management action is determined, the main server 200 transmits a management action data packet including the management action information as shown in step 507. Returning to the VCR example above, the management action data packet would include the action "begin recording." In step 509, the electronic device to be managed receives and processes the management action data packet. In a preferred embodiment, the data packet also includes a unique identifier for the VCR 214 so that only this electronic device will receive and process the wireless data packet sent by the main server 200 in step 507.

In step 511, the electronic device controlled then performs the action of the management action data packet. That is, the VCR 214 will turn on the recording function at 2:30 AM. In most instances, the management action will be some action that the electronic device can automatically perform based on the management action data packet. However, it is to be understood that the present invention is not limited to automatic control. For example, the management action may be to display a reminder message on mobile terminals 208 and 212 reminding the user of wireless LAN 150 to clean out or change a water filter in refrigerator 210.

In a preferred embodiment, the electronic device that performs the management action will generate a management action report and send this report to the main server 200 as shown in step 513. The management action report is a data packet that includes information that the action was performed or was not performed by the electronic device due to some malfunction. In step 515, the report is received and stored in the main server 100 so a user can access and review the report. Once this report is received by the main server 200, the main server 200 again begins monitoring management initiating parameters of electronic devices on the wireless home network. Thus, FIG. 5 indicates the process steps for managing electronic devices on a wireless home network. While the process of FIG. 5 is described with respect to the home network of FIG. 2, it is to be understood that the process of the present invention may be performed on a workplace network of FIG. 3 or any other wireless network that includes a variety of electronic devices.

Figure 6A:
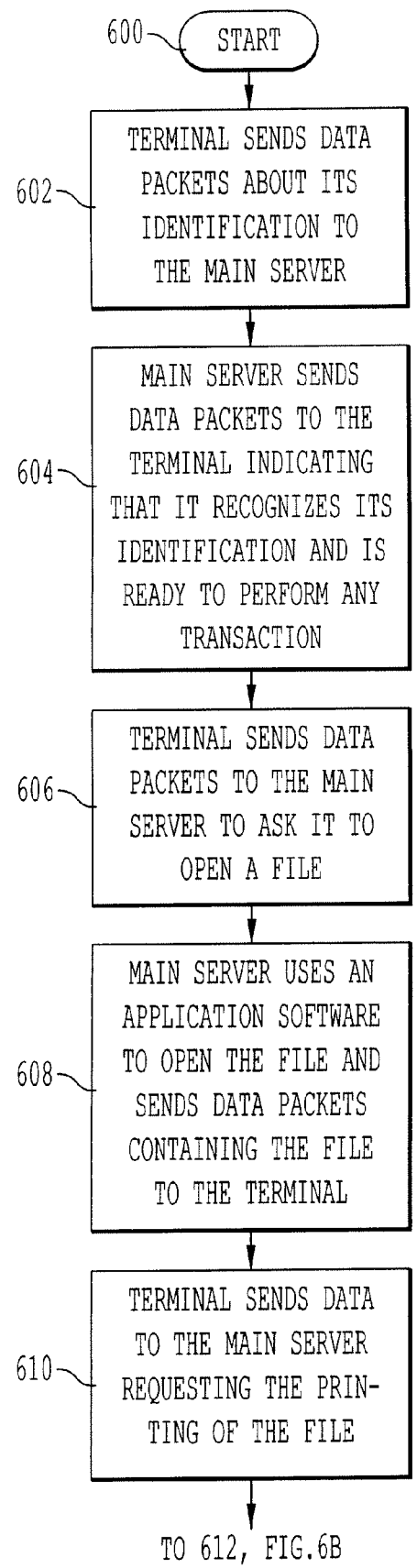
FIG. 6 is a flow chart illustrating a process of a mobile terminal accessing the resources of a main server in accordance with one embodiment of the present invention.
Figure 6B:
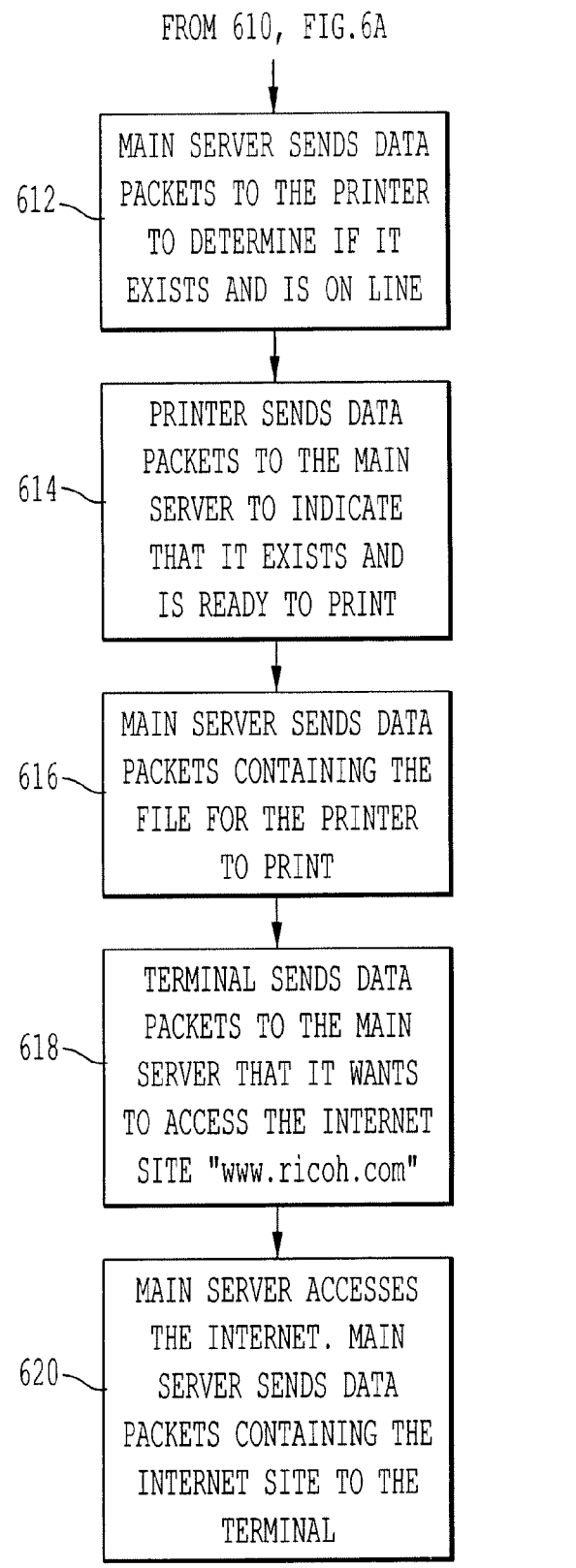

As previously noted, the wireless LAN system of the present invention not only provides management and control of the electrical devices connected to the LAN, but also allows for the sharing of resources of the main server. FIG. 6 is a flow chart illustrating a process of the mobile terminal 316 of FIG. 3 accessing the resources of the main server 300. As with the previously described process, all transfer of data packets between devices occurs by wireless transmission via respective antennas. As seen in FIG. 3, the main server 300 has wireless access to external memory 304 and a printer 308. Whenever the main server 300 needs the service of either external memory 304 or printer 308, the main server 300 will send wireless data packets with instruction and data on what the main server wants these electronic devices to do. By sending data packets to the main server 300, the terminal 306 may view a file located in the external memory 304, use an application software in the main server 300, print a file on the printer 308, or access the Internet 120.

The process begins in step 600 when the user of mobile terminal 306 turns on the mobile terminal. This may be done by use of a power switch or by activating an input device of the mobile terminal to awake the terminal from a power saving or "sleep" mode. In step 602, the mobile terminal 306 sends data packets that identify the mobile terminal 306 to the main server 300 thereby indicating to the main server that the mobile terminal 306 is ready to use the resources of the main server 300. The main server 300 permits access only to those terminals that are registered to use the shared resources. This prevents unauthorized access to the main server 300 and its resources. As noted in the description of FIG. 4, the main server 300 waits for transaction requests from the terminal 306.

Once the main server 300 receives the identification data packets from the terminal and verifies that the identification is valid, the main server 300 transmits verification packets to the mobile terminal 306 as shown by step 604. The verification packets inform the mobile terminal 306 that the main server 300 recognizes the terminal as a valid user of the main server resources. The main server 300 is then ready to perform a requested transaction for the mobile terminal 306. In step 606, the mobile terminal 306 sends data packets to the main server 300 requesting to open a file located on a file server of the main terminal 300. The main server 300 receives the file request and then determines the application software that allows the opening of the file as shown in step 608. The main server 300 then starts the appropriate application software, opens the requested file, and sends data packets to the mobile terminal 316 that allow the mobile terminal to view the requested file.

Once the file is opened by the mobile terminal 306, the user of the mobile terminal 306 may want to print out the file. In step 610, the mobile terminal 306 sends data packets to the main server 300 requesting printing of the file opened. Once the main server 300 receives the print request, the main server must determine whether the printer is accessible to the main server. In step 612, the main server 300 sends data packets to the printer 308, for example, to determine if the printer exists and is on line. In step 614, the printer 308 sends data packets to the main server 300 indicating that it exists and ready to print. In an alternative embodiment, the main server 300 may determine that the printer 308 exists and is on line by maintaining a list of items connected to the network as described with respect to FIG. 4.

Once the main server 300 determines that the printer 308 is available, the main server 300 sends data packets containing the file to be printed to the printer 308 as shown in step 616. The file is then printed on a print medium loaded in the printer 308. Thus, steps 606 through 616 of FIG. 6 indicate the method for the mobile terminal 306 accessing and opening a file on the main server 300, and then printing the opened file on network printer 308.

With the file printed, the user of mobile terminal 306 may want to access the Internet 120. In a preferred embodiment, the mobile terminal 306 and/or main server 300 includes Web browser software for communicating with remote web servers via Internet 120. To access web pages on a remote server, the user inputs a uniform resource locator (URL) identifying the location of the requested web page. Details of accessing and using the Internet may be found in "How The Internet Works", by Preston Gralla, the entire contents of which is incorporated herein by reference. Thus, in step 618, the mobile terminal 306 sends data packets to the main server 300 requesting access to the Internet website www.ricoh.com, for example. The main server 300 receives the Internet access request and, in step 620, the main server starts the web browser software such as Netscape Navigator or Microsoft Internet Explorer to access the Internet 120 and to go to the requested website. The main server 100 then uses the URL to access the requested website and sends data packets of the content of the web site, such as web pages, to the mobile terminal 316. Thus, FIG. 6 illustrates how a mobile terminal can utilize the software, hardware, and Internet resource of the wireless network in accordance with the present invention.

Figure 7:
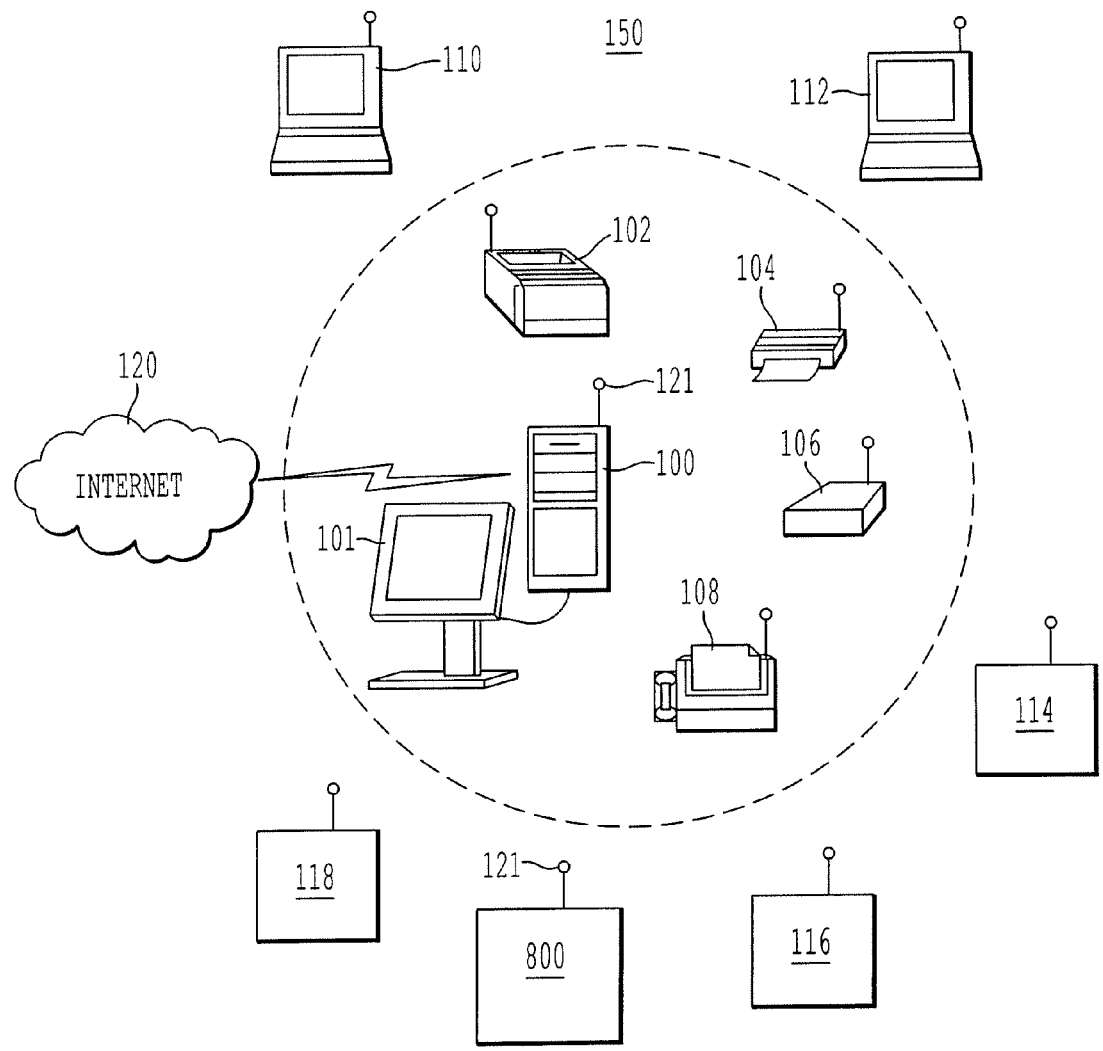
FIG. 7 is a system diagram illustrating a system for managing and controlling a local network of electronic devices using a control device in accordance with an embodiment of the present invention.

As described above, the electronic devices may be managed and resources may be shared using a main server to communicate via the wireless LAN. In another embodiment of the present invention, a portable control device provides a uniform interface for manual control of the electronic devices on the wireless LAN. FIG. 7 is a system diagram illustrating a system for managing and controlling a local network of electronic devices using a control device. The system of FIG. 7 is identical to the system of FIG. 1 except that the system of FIG. 7 includes control device 800 as well as applications software that allows remote manual control of electronic devices using the control device 800. As with the other devices on the LAN, the control device 800 includes a transceiver and antenna 121 for communicating wirelessly with the main server 100 and other nodes of the LAN. The control device is a lightweight handheld device similar to a remote control for a television, for example. However, the antenna 121 of the control device emits an omnidirectional signal rather than the directional infrared signal of the conventional remote control device. Therefore, the control device 800 can control the electronic devices on the wireless LAN without being in line of sight of the device to be controlled.

Figure 8:
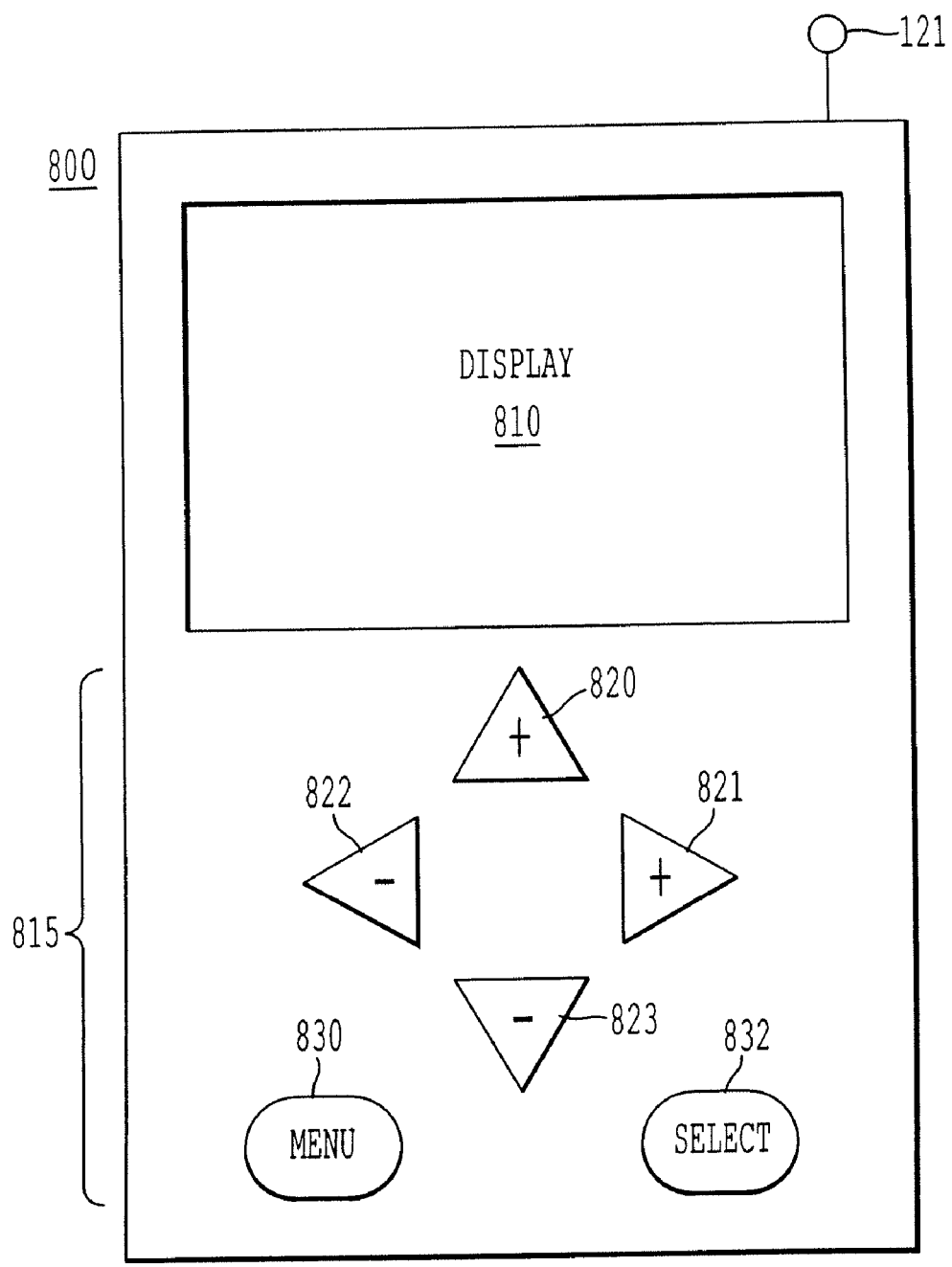
FIG. 8 is an illustration of the control panel of a control device in accordance with one embodiment of the present invention.

FIG. 8 is an illustration of the control panel of the control device 800. As seen in this figure, the control device includes a display 810 and an input keypad 815. The display is preferably a liquid crystal display (LCD), but may be implemented as any one of the known display devices. The keypad 815 includes up directional button 820, right directional button 821, left directional button 822, down directional button 823, and menu and select buttons 830 and 832 respectively. The directional buttons 820 through 823 are used to navigate through menus displayed on the display 810. The menu button 830 and the select button 832 are used to initiate the display of a menu and to select items in a menu as will be further described below. In a graphical user interface environment, the directional buttons and menu and select buttons may be configured to operate as a mouse. Thus, the control device 800 is a simple portable wireless device for displaying, navigating and selecting control menus for the electrical devices connected to the wireless LAN.

Figure 9:
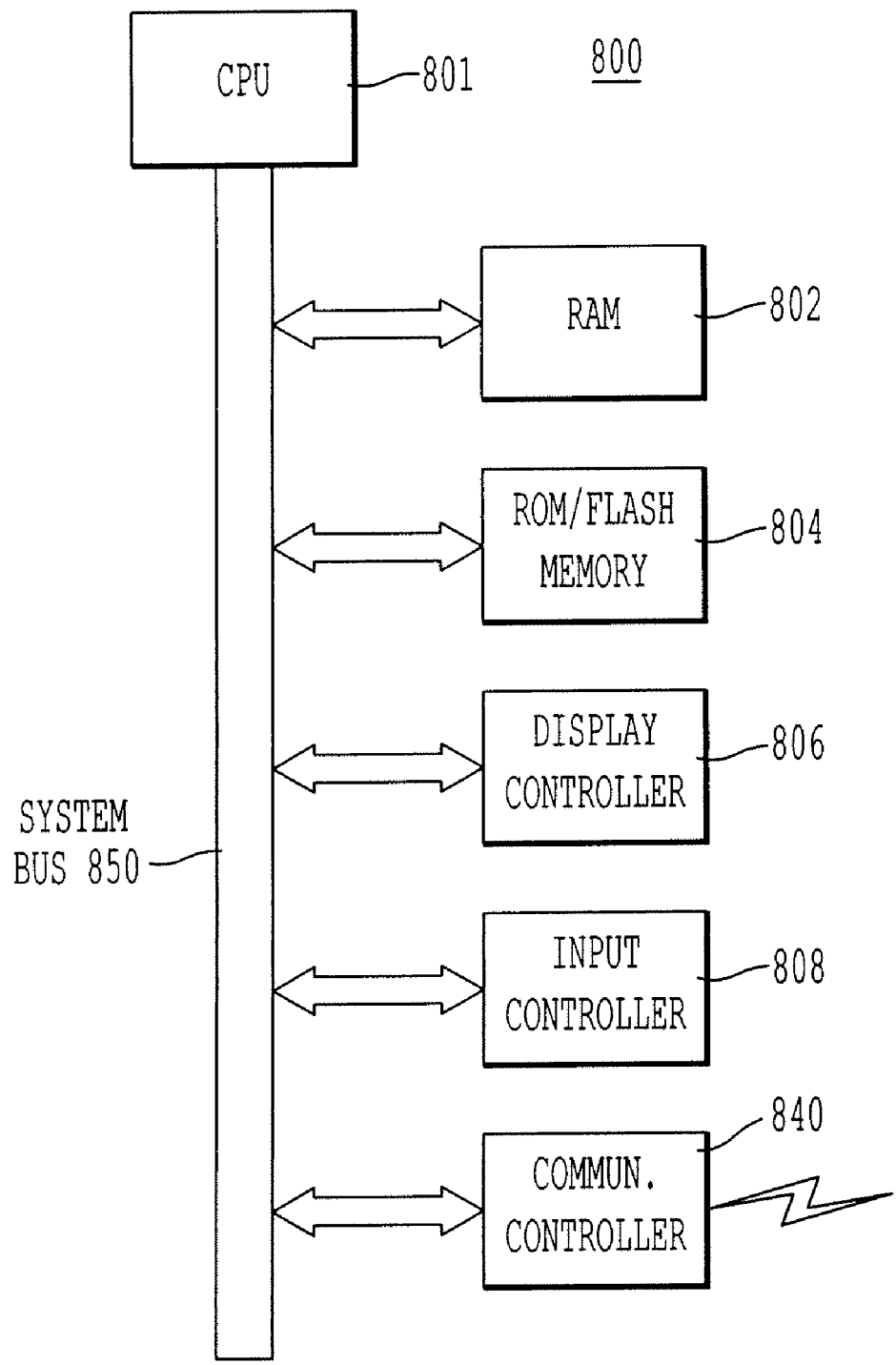
FIG. 9 is a block diagram of a control device in accordance with one embodiment of the present invention.

FIG. 9 shows a block diagram of the control device 800. The control device 800 includes CPU 801, RAM 802, ROM 804, display controller 806, Input controller 808, and communications controller 840. The various units of the control device 800 are interconnected by way of system bus 850. The CPU 801 processes instructions or sequences of instructions stored in the RAM 802 and/or ROM 504 in response to input commands of a user via input controller 508. The display controller controls the display of images and text on the display in response to commands from the CPU 801. Communications controller 510 allows the control device 800 to receive and process wireless digital data from the main server and other electronic devices on the wireless LAN. It is to be understood that the items in the block diagram of FIG. 9 are exemplary items intended to provide a functional description of the control device 800. The control device may incorporate any of the components of a known wireless computing device such as the Palm Pilot manufactured by Palm, Inc. In addition, the control device may include any of the features of a general computing device such as the device described in FIG. 14.

Figure 10:
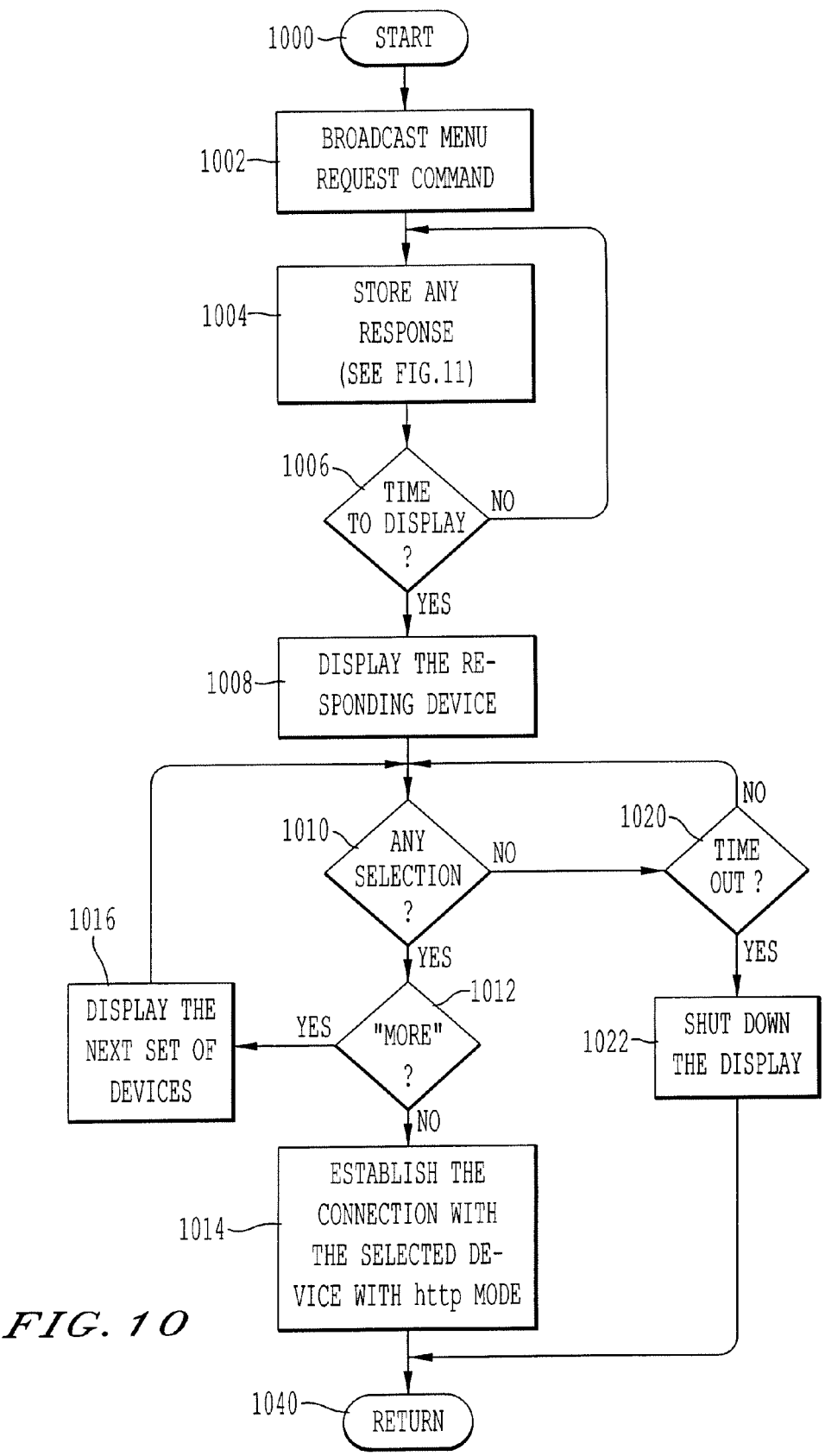
FIG. 10 is a flow chart illustrating the process manually controlling electronic devices using a control device in accordance with an embodiment of the present invention.

FIG. 10 is a flow chart indicating the process manually controlling electronic devices using the control device 800 in accordance with the present invention. The process begins at step 1000 when the user of the control device 800 presses the menu button 830 on the input keypad 815. In step 1002, a Menu Request command is broadcast to the devices on the wireless LAN. The menu request message is a generic message requesting electronic devices on the wireless LAN to identify themselves and provide a location for the control menu of the respective electronic device. In one embodiment of the present invention, the control device 800 may request identification and control menu information only from electronic devices that are capable of communicating using a predetermined protocol used by the control device 800 such as hypertext transfer protocol (http). In another embodiment, the control device 800 requests identification and control menu information from all electronic devices on the network and the main server 100 converts the menu information to a communication protocol understandable to the control device 800 as will be further described below. Once the Menu Request command is sent, the control device 800 receives and stores any responses received from the electronic devices on the wireless network.

Figure 11:
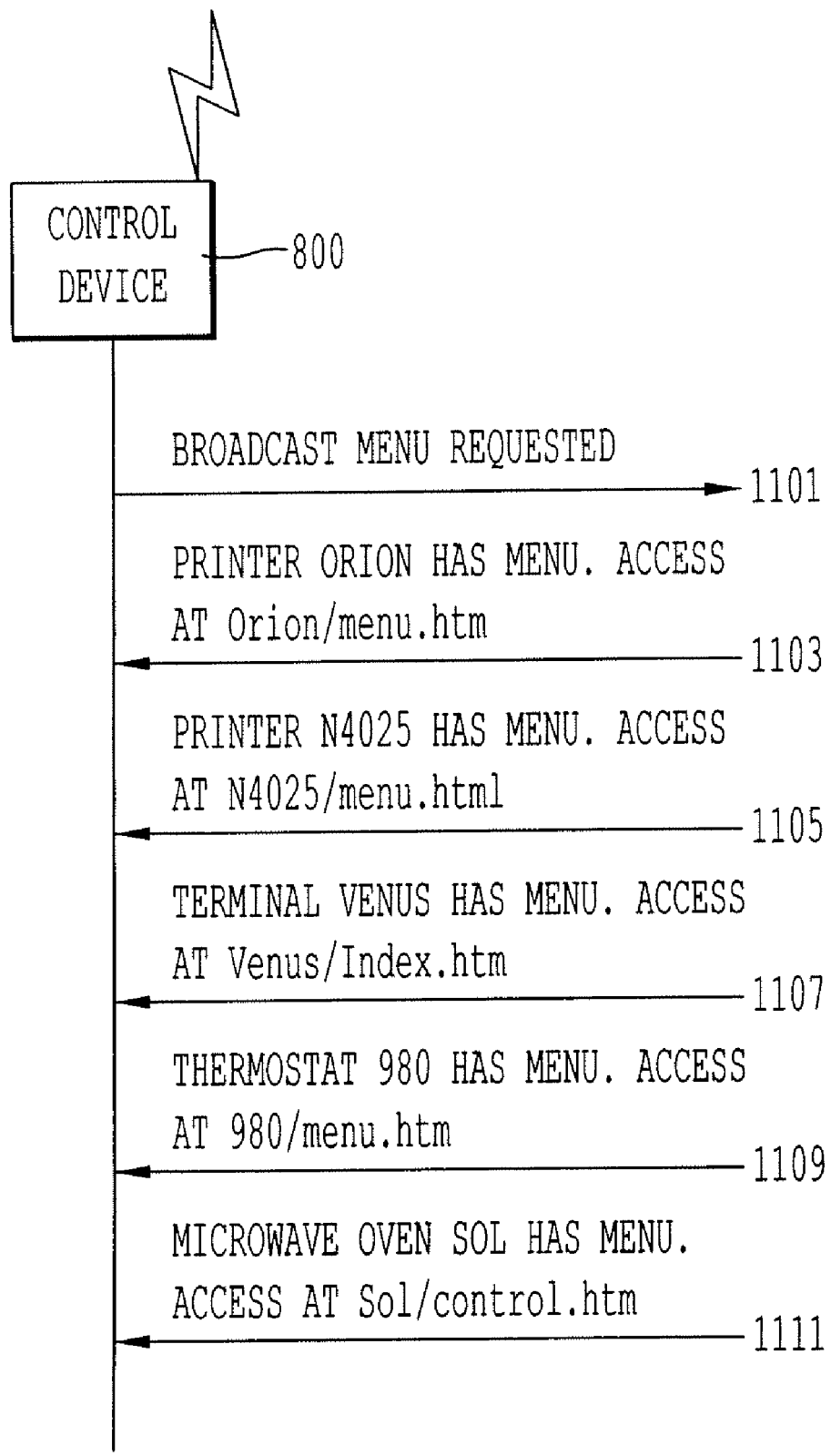
FIG. 11 is a sequence diagram showing the communication correspondence of a control device according to one embodiment of the present invention.

As with the main server of FIG. 1, the control device 800 may use any known MAC protocol to ensure that only one device of the wireless LAN has access to the shared link of a multiple access link at any one time. For example, FIG. 11 shows the communication correspondence when the Menu button is pressed at the control device 800. At the step 1101 the control device 800 broadcasts the menu request. Step 1101 corresponds to step 1002 in the flow chart of FIG. 10. In step 1103, the control device 800 receives a response from a first electronic device, the printer 102, for example. As seen in FIG. 11, the printer 102 is identified as printer "Orion" and has a menu location at Orion/menu.htm. The MAC used by the control device 800 allows only the printer Orion to communicate with the control device 800 at the time of step 1103. After this communication is completed, the control device receives a response from the printer identified as "N4025" which has a control menu at N4025/menu.html as seen in step 1105. Again, N4025 is the only node of the network that communicates with the control device 800 at the time of step 1105. The control device 800 then sequentially receives a response from the terminal "Venus," the thermostat "980," and the microwave oven "Sol" as illustrated in FIG. 11. While all of the responding devices of FIG. 11 are shown to have HTTP menu capability, the present invention does not require such a common protocol as mentioned above.

Figure 12:
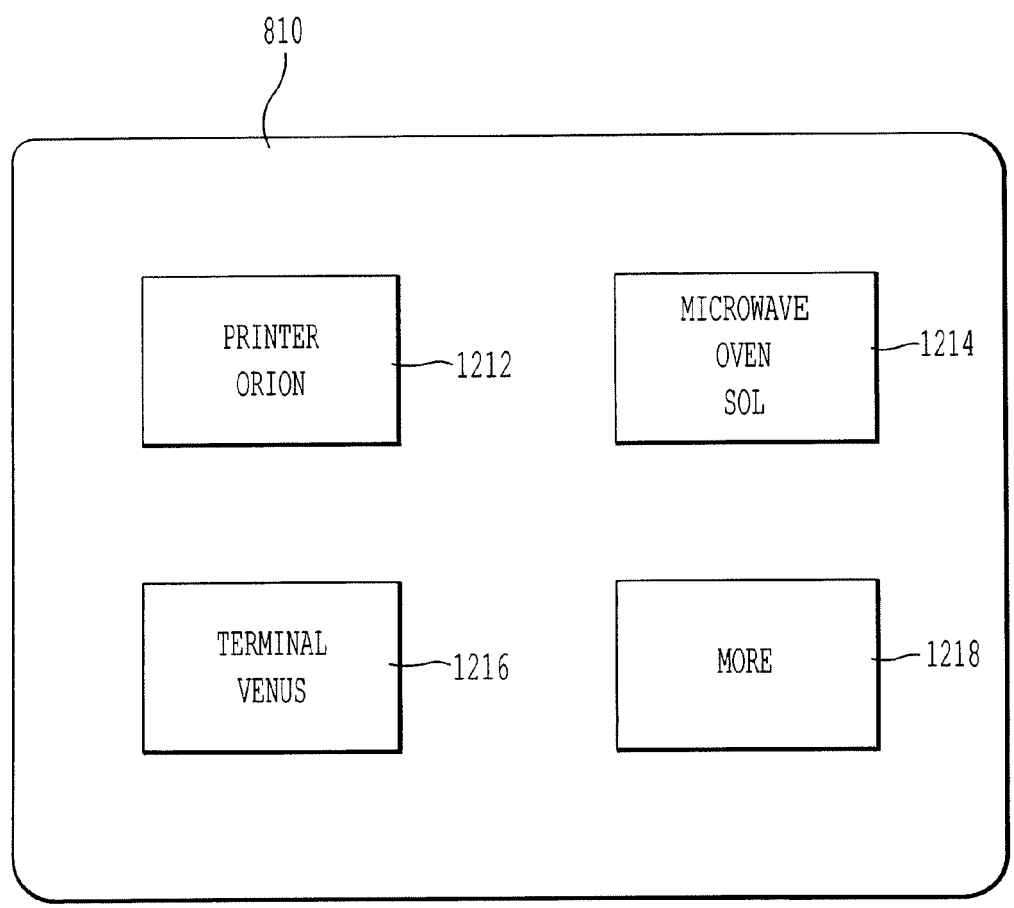
FIG. 12 is an illustration of a control device display displaying a graphical display of selection boxes according to an embodiment of the present invention.

Returning to the flow chart of FIG. 10, in decision block 1006, the control device 800 determines whether a predetermined time for responding to the menu request has lapsed. If the time has not lapsed, the control device 800 returns to step 1004 where it receives and stores more replies and menu locations of electronic devices connected to the wireless LAN as described with respect to FIG. 11. If the time to reply has expired, the control device 800 proceeds to step 1008 where the responding devices are displayed on the display 810 of the control device 800. The devices may be displayed in text format including the device identification and/or the location of the menu file on the main server 100 as exemplified in the text of FIG. 11. Alternatively, the list of devices may be a graphical display of icons or selection boxes with a device associated with each icon or selection box as shown in FIG. 12, which will be further described below. In a preferred embodiment, the control device displays the responding devices using a web supported cellular phone format so that a large display is not required.

After the responding devices are displayed on the control device 800, the control device determines whether a selection from the list has been made by the user as shown by decision block 1010. As indicated above, the user selects a device from the list displayed by using the input keypad 815 on the control device 800. If no selection has been made, the control device proceeds to decision block 1020 where it determines whether a predetermined time for making a selection has passed. If the selection time has passed, the control device 800 shuts down the display in step 1022 to preserve the battery power of the control device 800. Where a selection from the displayed list is made, the control device 800 proceeds to decision block 1012 where the control device determines if the selection made is a "more" selection.

In a preferred embodiment of the present invention, the control device 800 may receive and store the identification and menu location information for a larger number of electrical devices than can be displayed on the display 810 of the control device 800. Where such a large number of devices respond to the broadcast, the control device 800 displays a first group of the responding devices on the display along with a "more" option as shown in FIG. 12. FIG. 12 is an illustration of the display 810 displaying a graphical display of selection boxes according to an embodiment of the present invention. As seen in this figure, selection box 1212 is associated with printer Orion, selection box 1214 is associated with microwave oven Sol, and selection box 1216 is associated with terminal Venus. Thus, the display of FIG. 12 displays the electronic devices that responded in the communication protocol of FIG. 11. In this regard, the selection box 1218 is provided because there are responding devices that cannot be displayed on the display 810, namely the printer N4025 and the thermostat 980.

Where the selection is the "more" selection box 1218, the control device 800 displays a second group of responding devices on the display 810 as indicated by step 1016 of FIG. 10. Where the selection is not the "more" selection box 1218, but rather an electronic device, the control device 800 establishes a connection with the selected device as shown in step 1014. In a preferred embodiment, the selection box of the selected item is shown on the display 810 in a highlighted fashion as shown by selection box 1214 of FIG. 12.

After the selection is made by the user, the control device 800 establishes a connection with the selected electronic device as seen in step 1014. As indicated above, one embodiment of the control device 800 receives and processes responses only from devices having an http protocol menu. In this embodiment, the control device 800 establishes a wireless connection directly with the selected device with an http mode. This allows communication with the selected device with limited intervention by the main server 100. In another embodiment, the control device 800 receives a response from all electronic devices including devices that have menu controls incompatible with the communication protocol of the control device. In this embodiment, step 1014 of establishing a connection with the selected device includes a step for determining whether the selected device has the same communication protocol as the control device or not. If the selected device has a different menu protocol, i.e. not http for example, the control device then contacts the main server 100 also as part of step 1014. The main server 100 includes software for translating the unfamiliar protocol of the selected device to a protocol understandable to the control device 800. Thus, step 1014 of establishing a connection with the selected device requires a connection be made through the main server 100. With the http connection established, the control device 800 exchanges control data with the electronic device to control the aspects of the electronic device.

Figure 13:
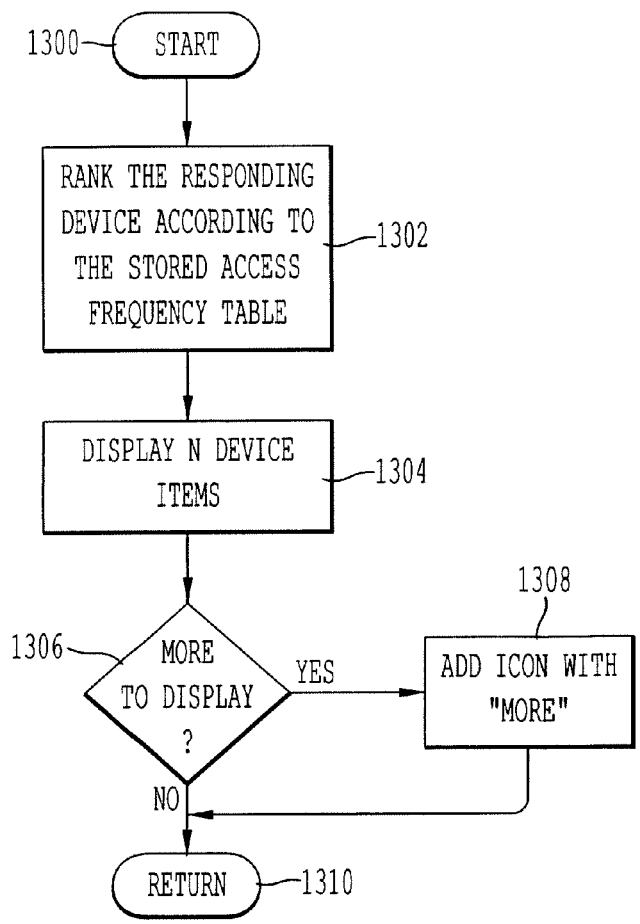
FIG. 13 is a flow chart illustrating a process for displaying the responding electronic devices on a control device in accordance with one embodiment of the present invention.

According to a preferred embodiment, the control device 800 provides the listing of responding electrical devices on the display 810 in a predetermined order. FIG. 13 is a flow chart illustrating a process for displaying the responding electronic devices on the control device in accordance with one embodiment of the present invention. In step 1302, the control device ranks the responding devices in accordance with a stored access frequency table. The access frequency table is a file that keeps track of user access to each of the electronic devices in the wireless local area network. With the responding devices ranked, the control device 800 displays N devices on the display 810 as shown by step 1304 where N represents the number of devices capable of being displayed on the display 810 at one time, N is determined by the display resolution and size. At the 1306, if there are more devices responding than N devices, the system adds "More" icon or word in the step 1308. At step 1310, it returns to the calling process.

Figure 14:
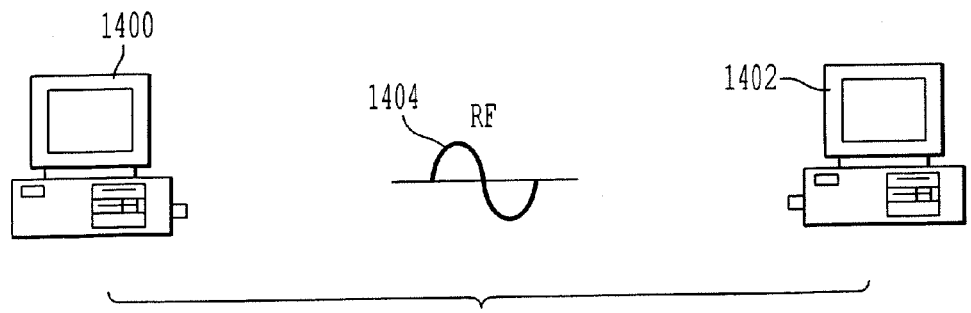
FIG. 14 is a schematic illustration of a peer-to-peer configuration of a wireless network.
Figure 15:
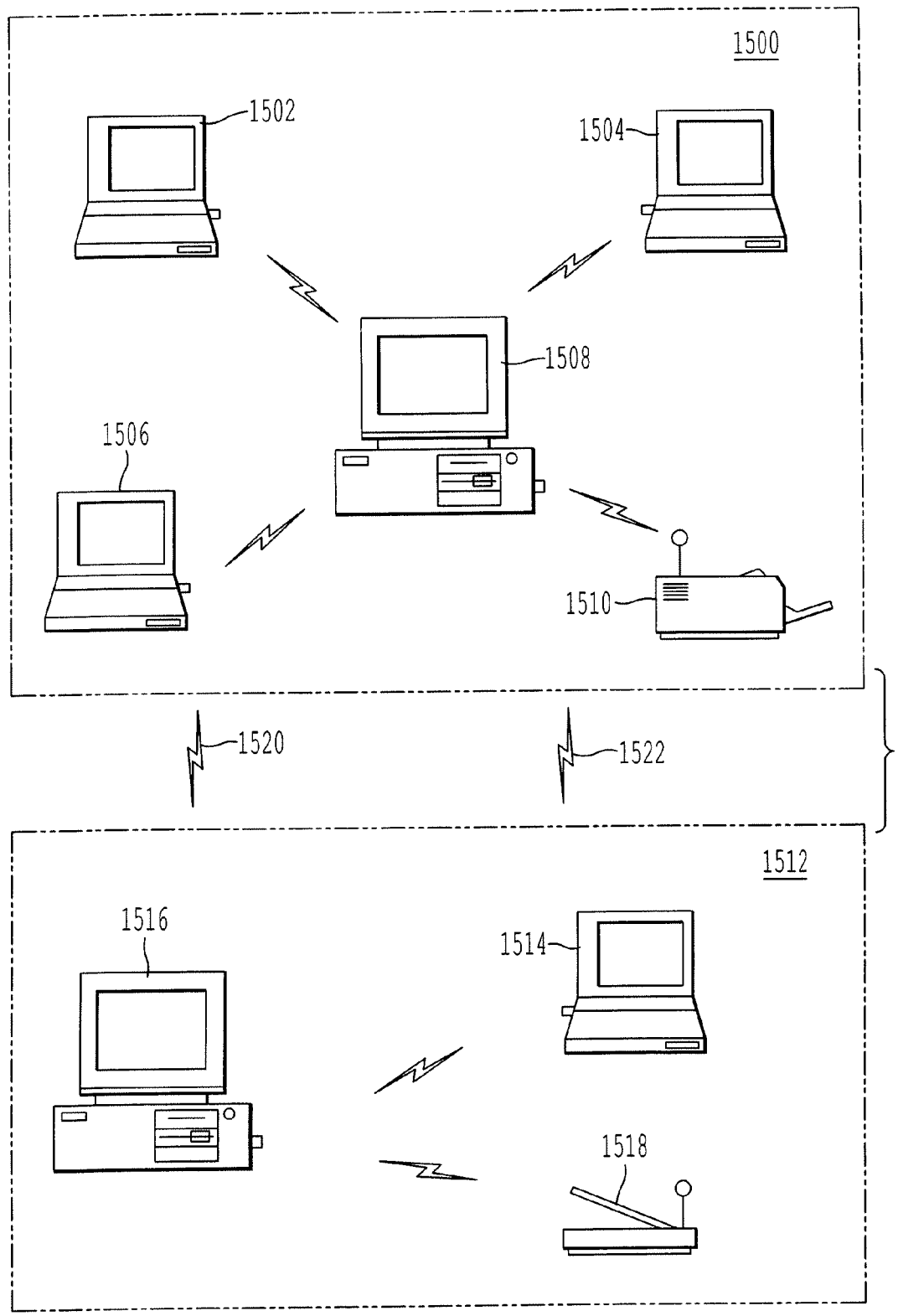
FIG. 15 is a schematic illustration of two adjacent wireless networks.

Thus, the main server 100 and/or control device 800 may be used to manage and control wireless electronic devices included in a wireless home or office LAN and provide shared resources to such wireless network devices. Widespread use of such home and wireless networks may cause a problem, however, in that adjacent wireless networks may interfere with one another. FIGS. 14 and 15 illustrate the problem of interfering communications in a wireless network environment. FIG. 14 is a schematic illustration of a peer-to-peer configuration of a wireless network. The wireless network includes wireless computers 1400 and 1402 each having wireless adapter cards that allow the computers to communicate wirelessly through electromagnetic signals such as RF signals 1404. Where each computer 1400 and 1402 is within the signal area of the other computer, the computers can access one another and, therefore, share resources.

FIG. 15 is a schematic illustration of two adjacent wireless networks. Wireless network 1500 includes terminals 1502, 1504, and 1506, as well as a resource manager 1508, and a printer 1510. All of the devices in network 1500 are equipped with hardware and software for allowing wireless communication, and therefore, the terminals 1502, 1504 and 1506 have wireless access to the resource manager 1508 and its hardware and software resources. Thus, any terminal can use software stored on the resource manager 1508 or the printer 1510 controlled by the resource manager 1508. Similarly, wireless network 1512 includes terminal 1514, resource manager 1516, and a scanner 1518, and the terminal 1514 can wirelessly access the resources, including the scanner 1518, of the resource manager 1516.

As illustrated by the electromagnetic wave symbols 1520 and 1522 in FIG. 15, the wireless networks 1500 and 1512 are in close enough proximity to one another that the terminals and resources of each network are within the signal range of the other network. This creates a problem because the terminals 1502, 1504 and 1506 may undesirably access the resources of the network 1512, and the terminal 1514 may undesirably access the resources of the network 1500. That is, the wireless networks 1500 and 1512 are not independent of one another because their communication ranges overlap.

Figure 16:
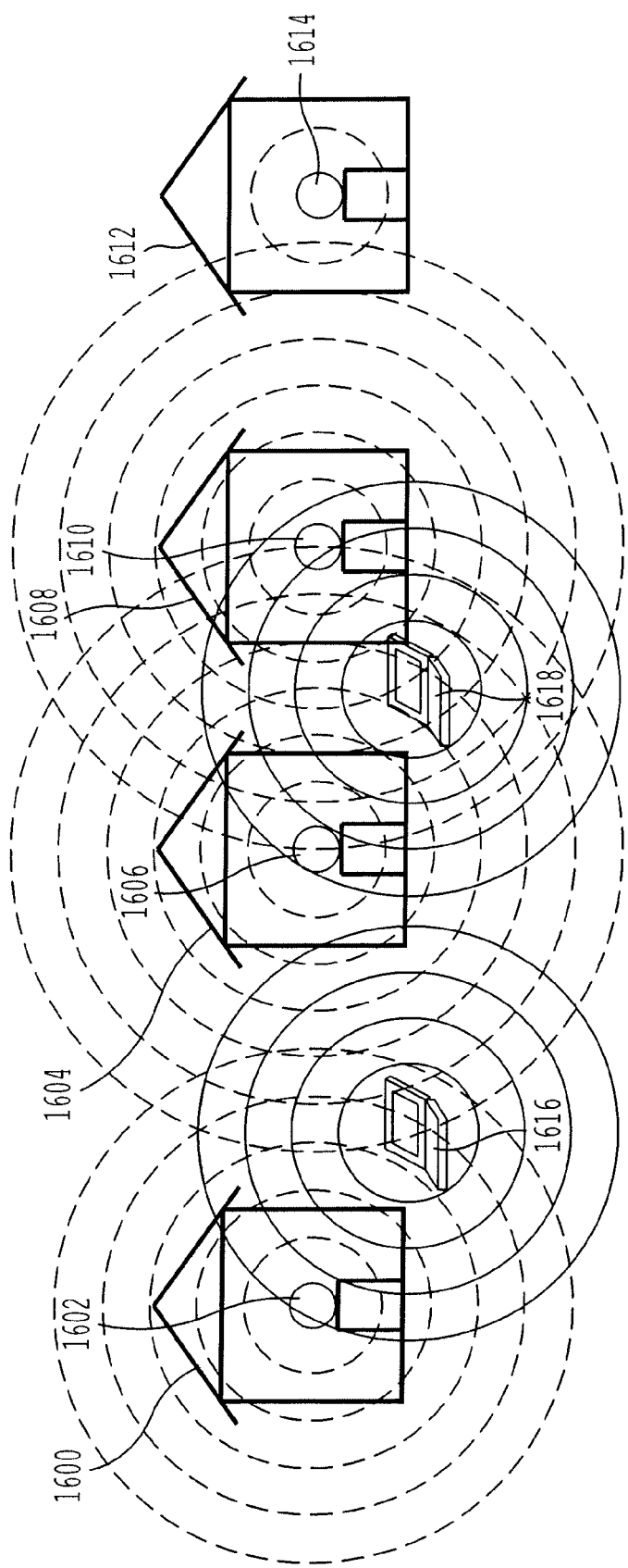
FIG. 16 is a schematic diagram illustrating the overlapping wireless home networks of adjacent houses in a neighborhood.

FIG. 16 is a schematic diagram illustrating the overlapping wireless home networks of adjacent houses in a neighborhood. As seen in this figure, houses 1600, 1604, 1608 and 1612 include main servers 1602, 1606, 1610, and 1614 respectively. Each main server 1602, 1606, 1610, and 1614 is a wireless network server such as the main server 100 in FIG. 1 or the server 200 in FIG. 2. Thus, while not shown in FIG. 16, each main server in FIG. 16 manages, controls and shares resources with wireless electronic devices included in a home network associated with the main server as described with respect to FIGS. 2 and 4 through 6. The signal range of each main server is indicated in FIG. 16 by a series of dashed circles concentric about a respective main server. The outermost dashed concentric circle for each main server represents the maximum signal range for that main server. Thus, as seen in FIG. 16, main servers 1602, 1606 and 1610 have a maximum range sufficient to cover the entire area of their respective houses 1600, 1604 and 1608, while main server 1614 has a maximum range that covers a part of the area of house 1612. Therefore, the electronic devices for the wireless networks in homes 1600, 1604, and 1608, may be placed anywhere in their respective houses. However, the location of the electronic devices in the house 1612 is limited to a specific area because the RF signals sent by the main server 1614 reach only a specific area of the house 1612. Devices 1616 and 1618 are exemplary wireless electronic devices to be used in a wireless home LAN. The signal range of each wireless electronic device in FIG. 16 is indicated by a series of solid lined circles concentric about a respective electronic device.

As described with respect to FIGS. 14 and 15, sharing of resources between wireless devices requires the wireless devices to be within each other's signal range. Thus, electronic device 1616 can effectively share resources with main server 1602, but cannot access the resources of main server 1606. However, electronic device 1618 can access the resources of either main server 1606 or main server 1610. Moreover, since the signal ranges of servers 1606 and 1610 reach each other, these servers can access the resources of each other. Due to privacy and home control interference considerations, it is undesirable for the server and associated electronic devices of one home network to be able to access the main server and resources of a neighboring home network. These considerations are even more important in an office network context.

Figure 17:
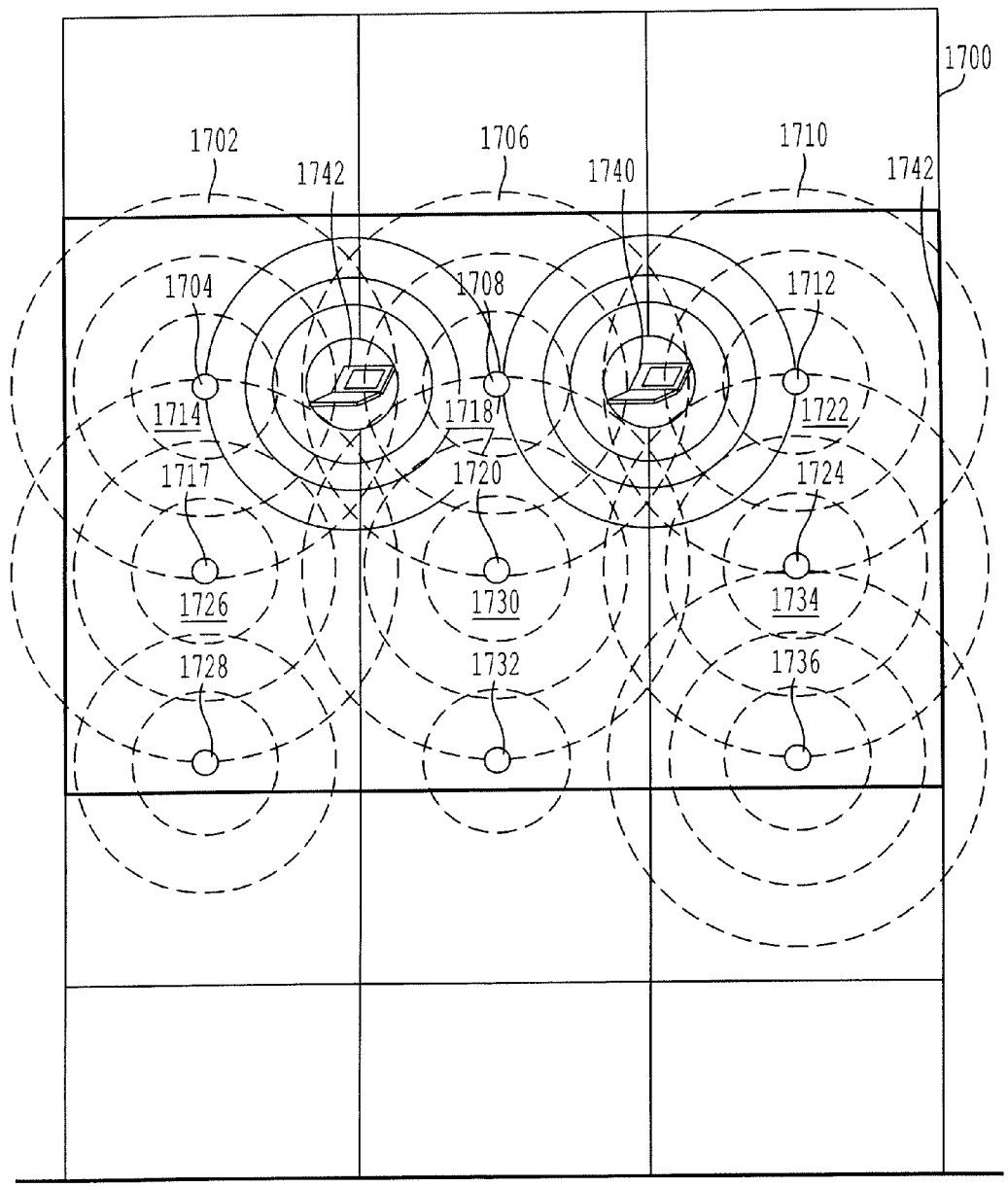
FIG. 17 is a schematic diagram illustrating the overlapping wireless office networks of adjacent offices in an office building.

FIG. 17 is a schematic diagram illustrating the overlapping wireless office networks of adjacent offices in an office building 1700. As seen in this figure, offices 1702, 1706, 1710, 1714, 1718, 1722, 1726, 1730 and 1734 include main servers 1704, 1708, 1712, 1716, 1720, 1724, 1728, 1732 and 1736 respectively. Each main server 1704, 1708, 1712, 1716, 1720, 1724, 1728, 1732 and 1736 is a wireless network server such as the main server 100 in FIG. 1 or the main server 300 in FIG. 3. Thus, while not shown in FIG. 17, each main server in FIG. 16 manages, controls and shares resources with wireless electronic devices included in an office network associated with the main server as described with respect to FIGS. 3-6.

The signal range of each main server is indicated in FIG. 17 by a series of dashed circles concentric about a respective main server. The outermost dashed concentric circle for each main server represents the maximum signal range for that main server. Thus, as seen in FIG. 17, main servers 1704, 1708, 1712, 1716, 1720, 1724, and 1736 have a maximum range that essentially covers the entire area of their respective offices, while main servers 1728 and 1732 have a maximum range that covers a part of the area of their respective offices. Therefore, the electronic devices for the wireless networks in offices 1702, 1706, 1710, 1714, 1718, 1722 and 1734, may be placed essentially anywhere in their respective offices. However, the location of the resources in offices 1726 and 1730 is limited to a specific area because the RF signals sent by the main servers 1728 and 1732 reach only a specific area of these offices. Devices 1740 and 1742 are exemplary wireless electronic devices to be used in a wireless office LAN. The signal range of each wireless electronic device in FIG. 17 is indicated by a series of solid lined circles concentric about a respective electronic device.

As described with respect to FIGS. 14 and 15, sharing of resources between wireless devices requires the wireless devices to be within each other's signal range. Thus, electronic device 1740 of FIG. 17 can access the resources of main server 1708 or main server 1712. Similarly, the wireless electronic device 1742 is able to share resources with both the main server 1704 and the main server 1708. Moreover, due to the close proximity of the offices shown in FIG. 17, several of the main servers in this figure are in the signal range of adjacent main servers and, therefore, are able to access the resources of the adjacent main servers. Given the sensitive and proprietary nature of business communication, it is undesirable for one office LAN to access and/or control the resources of an adjacent office LAN. This is particularly important if the offices of the building 1700 correspond to different companies.

Thus, where wireless home or office networks have overlapping signal areas, it is desirable for each network to operate independently by sharing resources only with authorized devices on its network. As noted with respect to FIG. 6 above, such independence can be accomplished by the main server permitting access only to registered electronic devices. U.S. patent application Ser. No. 10/198,991, the entire contents of which is incorporated herein by reference, discloses a method for using the control device 800 as a portable registration device for reliably and securely adding new network devices to the appropriate LAN in an environment where more than one wireless LAN exists. However, the use of a portable registration device to locally register an electronic device may be undesirable to some users. Specifically, the wireless device may be unavailable due to misplacement, damage or expended batteries. In this situation, a new wireless electronic device cannot be added to the network. Moreover, a separate registration device adds to the cost of implementing the wireless network.

Figure 18:
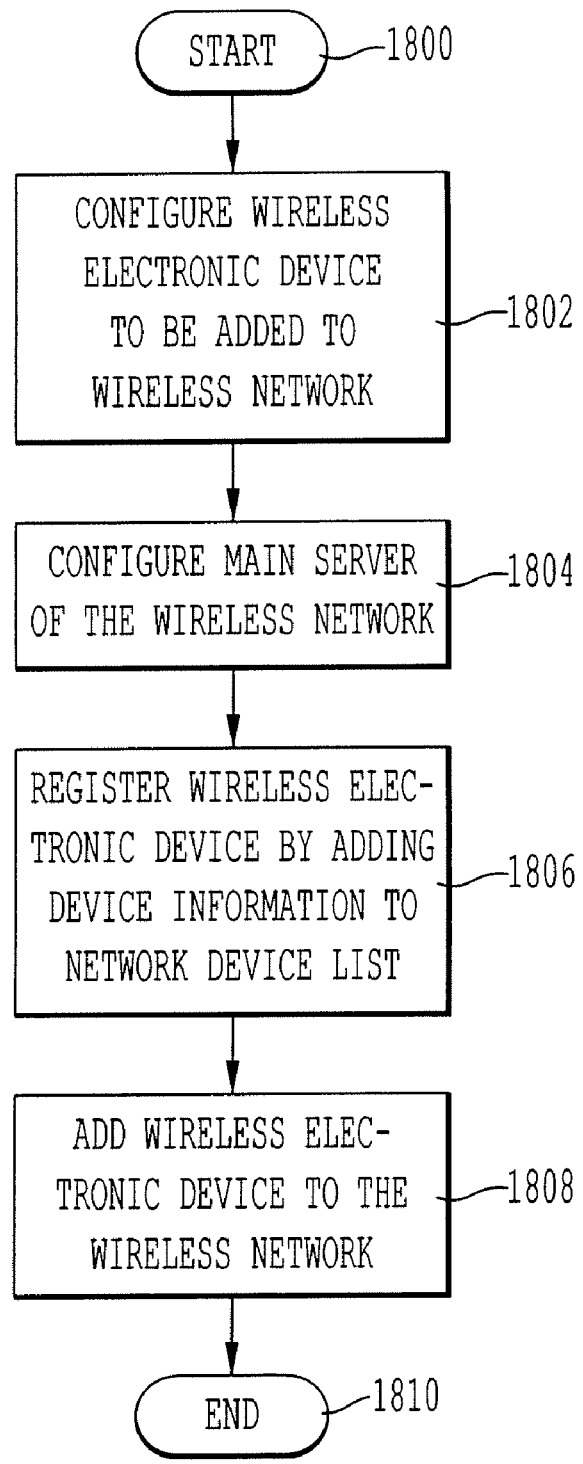
FIG. 18 shows a method of registering and adding a wireless electronic device to a wireless LAN without the need for a portable registration device.

FIG. 18 shows a method of registering and adding a wireless electronic device to a wireless LAN without the need for a portable registration device. The method shown in FIG. 18 applies to registering and adding any of the mobile terminal, Office equipment, entertainment device, appliance or environmental control device of FIG. 1 to a home or office wireless network. As seen in FIG. 18, after start of the process in step 1800, a user configures the wireless electronic device being added to the wireless LAN to only recognize communications from the main server associated with the user's wireless network. For example, if a user wishes to add the wireless electronic device 1740 to the network associated with main server 1708, the user would configure the device 1740 to recognize only communications from the main server 1708 located in office 1706.

Configuration of the wireless electronic device being added may include setting the electronic device to operate only at a unique frequency used by the main server and known only to the user of the network. The wireless electronic device may be configured at the hardware level to only receive a specific frequency, or at the software level to process only messages received and having the specific frequency of the main server. Alternatively, configuration of the wireless electronic device being added to the LAN may be accomplished by inputting the main server's secret bit address into the device. With this configuration, the electronic device decodes all received messages, but processes only those messages having the bit address of the main server. Finally, the electronic device may be configured to operate using an encryption method unique to the main server. Any known encryption method may be used and the details of encryption methods may be found in "How The Internet Works", by Preston Gralla, the entire contents of which is incorporated herein by reference. Configuration of the wireless electronic device being added to the network may also include enabling the wireless electronic device to transmit messages having a general characteristic common to all devices on the network as will be further described below.

Once the wireless electronic device being added is configured, the main server is configured by the user to allow only registered devices to access the main server as shown in step 1804. Returning to the example of FIG. 17, the user would configure the main server 1708 to recognize communications from the device 1740, but not communications from device 1742 or adjacent main servers. Similar to the configuration of the electronic devices, the main server may be configured by setting the main server to a frequency compatible with the electronic device being added, or inputting to the main server a bit address or encryption method compatible with the electronic device being added to the network. Configuration of the main server may be a general configuration that requires setting the main server to recognize a general characteristic of wireless communications received from devices configured by the user to be on the network. The general characteristic of the received messages may be a general frequency, identifier or encryption key common to the main server and all registered devices on the network. For example, if registration is done generally by frequency, the main server and all devices on the network are set to a single frequency known only to the user, and all communications are done using that frequency.

However, in order to carry out the management, control and sharing of resources described above, the main server is preferably able to uniquely identify each electronic device on the network. For example, the main server 1708 in FIG. 17 may serve, in addition to the electronic device 1740, a wireless climate control system and wireless security system. Of course, management and control of these devices requires the main server to send a particular command to a specific network device, thereby requiring each device on the network to have a unique identifier. Thus registration of a wireless electronic device with a main server is preferably accomplished by use of each device's unique identifier. In one embodiment, the main server may identify each electronic device on the network by a unique communication frequency of the device. In this embodiment, the main server is configured to receive a broad range of frequencies, including the discrete frequency of each electronic device on the LAN. Alternatively, the main server may identify each electronic device by a unique bit address or encryption key for the device.

Where registration of each network device is based on the device's unique identifier, the configuration step 1804 includes inputting information about the device being added, along with the unique frequency, address or encryption key of the of the device. Thus, as shown by step 1806, the main server completes registration of the device being added to the network by adding the device information and unique identifier to a registered network device list. The network device list is stored in main server memory and is preferably in a relational database format where device information such as "climate control" or "mobile terminal" is associated with the unique identifier assigned to that device. In the example of FIG. 17, the information and unique identifier for the wireless electronic device 1740 is added to the network device list maintained in the memory of main server 1708.

Once the wireless electronic device to be added is registered with the main server as described above, the electronic device is added to the LAN as shown by step 1808. The device is added by simply placing the registered device in proximity to the main server such that the signal area of the main server reaches the added wireless electronic device, and the signal area of the registered wireless electronic device reaches the main server. In the example of FIG. 17, the wireless electronic device 1740 can be placed virtually anywhere in the office 1706. The process of registering and adding a new device to the LAN then ends as shown by termination 1810, and the main server can monitor, control and share resources with the electronic device added as described in FIG. 4 through 6.

Figure 19:
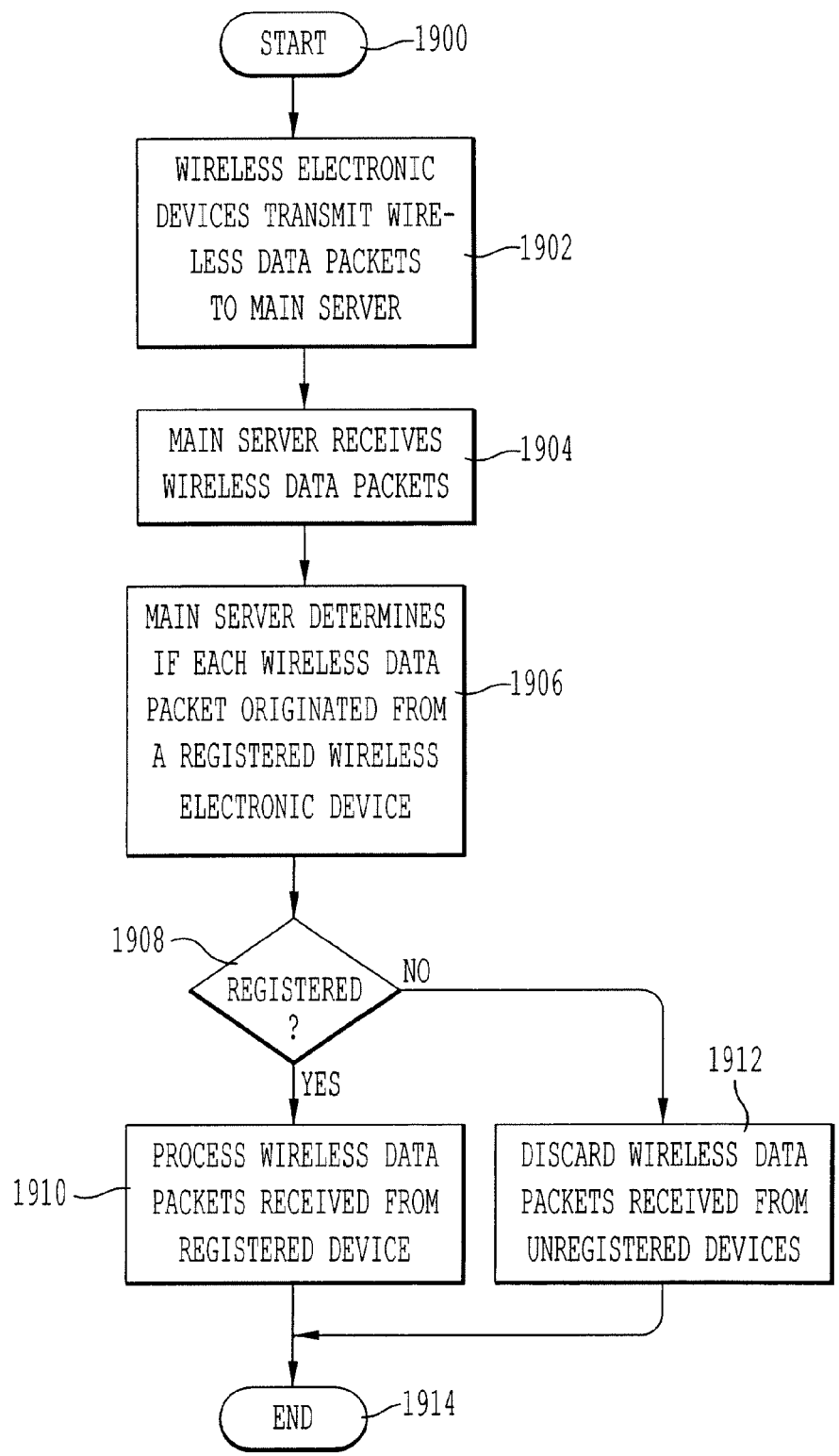
FIG. 19 is a flow chart showing the process of the main server communicating with only registered devices as an independent wireless LAN.

FIG. 19 is a flow chart showing the process of the main server communicating with only registered devices as an independent wireless LAN. After the start of the process in step 1900, wireless electronic devices having sufficient signal range to reach the main server transmit wireless data packets to the main server as shown by step 1902. The wireless data packets may include management initiating parameters, requests for access to resources, or any other data used in carrying out the management, control and resource sharing functions described above. Moreover, the data packets are sent from both registered and unregistered wireless electronic devices. Thus, both device 1740 and 1742 in FIG. 17 send a wireless data packet to the main server 1708, even though the device 1742 is not registered with the main server 1708. Because the main server 1708 is within the signal range of both 1740 and 1742, the main server 1708 receives the packets from these devices as shown in step 1904.

In step 1906, the main server determines if a wireless packet is sent from a device that was registered with the main server. Where several wireless packets have been received, the main server may queue up the packets and make the determination one wireless packet at a time. Thus, in the example of FIG. 17, the main server 1708 may first determine whether wireless electronic device 1740 is a registered device, and then determines whether device 1742 is a registered device.

Where devices are generally registered, the main server simply determines if a particular wireless data packet includes the general characteristic, i.e. frequency, bit address or encryption key, common to all registered devices on the network. If the data packet has this general characteristic, the main server determines that the wireless data packet originated from a registered device, or, otherwise, that the data packet did not originate from a registered device. Where registration is determined by the unique identifier of an electronic device, the main server obtains a unique identifier, such as a frequency, bit address or encryption key, from the wireless data packet and compares the obtained unique identifier to the list of registered devices maintained in memory. Where the obtained identifier is on the registered device list, the main server determines that the data packet originated from a registered device. If the obtained identifier is not on the registered device list, the main server determines that the data packet did not originate from a registered device. Thus, the main server 1708 in FIG. 17 would determine that one wireless data packet was received from registered wireless electronic device 1740, while another data packet was received from unregistered wireless electronic device 1742.

Where the main server determines in step 1906 that a wireless packet originated from a registered device, decision block 1908 directs the process flow to step 1910, where the main server processes the wireless data packet in accordance with the content of the packet. As described above, this content may relate to any of the monitoring, control and resource sharing functions described above. Moreover, where the function requires the main server to reply to the registered device, the main server sends a data packet using the main server's format that was made known to the electronic devices during configuration step 1802 of FIG. 18. In a preferred embodiment where each wireless electronic device has a unique identifier, the main server includes the unique identifier in all communications to the registered device. If groups of similar electronic devices exist on the wireless network, the general registration method may be used in which case the main server communications to the registered devices include the general characteristic described above.

Where the main server determines in step 1906 that a wireless data packet originated from a unregistered device, decision block 1908 directs the process flow to step 1912, where the main server discards the wireless data packet. In a preferred embodiment, the main server also sends the unregistered device a message informing the device that it has been denied access to the main server. Thus, the system and method according to the present invention allows adjacent wireless networks to act independently of one another.

FIG. 20 illustrates a computer system 2001 upon which an embodiment according to the present invention may be implemented. As indicated above, the computer system 2001 may function as the main sever in accordance with the present invention. Computer system 2001 includes a bus 2003 or other communication mechanism for communicating information, and a processor 2005 coupled with bus 2003 for processing the information. The processor 2005 may be implemented as any type of processor including commercially available microprocessors from companies such as Intel, AMD, Motorola, Hitachi and NEC.

The computer system 2001 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 2001 using an appropriate device bus (e.g., a small computer system interface (SCSI) bus, an enhanced integrated device electronics (IDE) bus, or an ultra-direct memory access (DMA) bus). The computer system 2001 may additionally include a compact disc reader, a compact disc reader-writer unit, or a compact disc juke box, each of which may be connected to the same device bus or another device bus.

Computer system 2001 may be coupled via bus 2003 to a display 2013, such as a cathode ray tube (CRT), for displaying information to a computer user. The display 2013 may be controlled by a display or graphics card. The computer system includes input devices, such as a keyboard 2015 and a cursor control 2017, for communicating information and command selections to processor 2005. The cursor control 2017, for example, is a mouse, a trackball, or cursor direction keys for communicating direction information and command selections to processor 2005 and for controlling cursor movement on the display 2013.

The computer system 2001 performs a portion or all of the processing steps of the invention in response to processor 2005 executing one or more sequences of one or more instructions contained in a memory, such as the main memory 2007. Such instructions may be read into the main memory 2007 from another computer-readable medium, such as storage device 2011. One or more processors in a multi-processing arrangement may also be employed to execute the sequences of instructions contained in main memory 2007. In alternative embodiments, hard-wired circuitry may be used in place of or in combination with software instructions. Thus, embodiments are not limited to any specific combination of hardware circuitry and software.

As stated above, the system 2001 includes at least one computer readable medium or memory programmed according to the teachings of the invention and for containing data structures, tables, records, or other data described herein. Stored on any one or on a combination of computer readable media, the present invention includes software for controlling the computer system 2001, for driving a device or devices for implementing the invention, and for enabling the computer system 2001 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 2005 for execution. A computer readable medium may take many forms, including but not limited to, non-volatile media, volatile media, and transmission media. Non-volatile media includes, for example, optical, magnetic disks, and magneto-optical disks, such as storage device 2011. Volatile media includes dynamic memory, such as main memory 2007. Transmission media includes coaxial cables, copper wire and fiber optics, including the wires that comprise bus 2003. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 2005 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 2001 may receive the data on the telephone line and use an infrared transmitter to convert the data to an infrared signal. An infrared detector coupled to bus 2003 can receive the data carried in the infrared signal and place the data on bus 2003. Bus 2003 carries the data to main memory 2007, from which processor 2005 retrieves and executes the instructions. The instructions received by main memory 2007 may optionally be stored on storage device 2011 either before or after execution by processor 2005.

Computer system 2001 also includes a communication interface 2019 coupled to bus 2003. Communication interface 2019 provides a two-way data communication coupling to a network link 2021 that is connected to a local network (e.g., LAN 2023). For example, communication interface 2019 may be a network interface card to attach to any packet switched local area network (LAN). As another example, communication interface 2019 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 2019 sends and receives electrical, electromagnetic or optical signals that carry digital data streams representing various types of information. The radio waves may be implemented using a spread spectrum technique such as Code Division Multiple Access (CDMA) communication or using a frequency hopping technique such as that disclosed in the Bluetooth specification previously described.

Network link 2021 typically provides data communication through one or more networks to other data devices. For example, network link 2021 may provide a connection through LAN 2023 to a host computer 2025 or to data equipment operated by a service provider, which provides data communication services through an IP (Internet Protocol) network 2027 (e.g., the Internet 607). LAN 2023 and IP network 2027 both use electrical, electromagnetic or optical signals that carry digital data streams. The signals through the various networks and the signals on network link 2021 and through communication interface 2019, which carry the digital data to and from computer system 2001, are exemplary forms of carrier waves transporting the information. Computer system 2001 can transmit notifications and receive data, including program code, through the network(s), network link 2021 and communication interface 2019.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method of managing electronic devices comprising:
providing a main server including software for managing network resources from a single point of administration;
receiving at said main server wireless data packets from a plurality of wireless electronic devices;
determining, at said main server, a registered device among said plurality of wireless electronic devices;
wirelessly connecting said registered device determined by said main server to said main server to create a wireless local area network (LAN) including the registered device and the main server; and
managing, at the main server, said registered device using said software, wherein said registered device comprises at least one of an appliance, an environmental control device, and an entertainment device, wherein:

said step of determining comprises determining a registered device based on a general characteristic of the wireless data packet received from the registered device, and said step of determining a registered device based on a general characteristic of the wireless data packet comprises:
- identifying a transmit frequency of the wireless data packet; and
- determining if said transmit frequency is a frequency common to all registered devices on the wireless LAN.

2. A main server for managing electronic devices comprising:
- a memory that stores software for managing network resources from a single point of administration;
- a receiver that receives wireless data packets from a plurality of wireless electronic devices; and
- a processor that determines a registered device among said plurality of wireless electronic devices and creates a wireless local area network (LAN) by wirelessly connecting the main server to said registered device, wherein said processor is further configured to manage said registered device using said software, and wherein said registered device comprises at least one of an appliance, an environmental control device, and an entertainment device, wherein:
  - said processor determines a registered device based on a general characteristic of the wireless data packet received from the registered device, and
  - said processor determines a registered device based on a general characteristic of the wireless data packet by:
    - identifying a transmit frequency of the wireless data packet; and
    - determining if said transmit frequency is a frequency common to all registered devices on the wireless LAN.

3. A main server for managing electronic devices comprising:
- a memory that stores software for managing network resources from a single point of administration;
- a receiver that receives wireless data packets from a plurality of wireless electronic devices; and
- a processor that determines a registered device among said plurality of wireless electronic devices and creates a wireless local area network (LAN) by wirelessly connecting the main server to said registered device, wherein said processor is further configured to manage said registered device using said software, and wherein said registered device comprises at least one of an appliance, an environmental control device, and an entertainment device, wherein:
  - said processor determines a registered device based on a unique identifier of the registered device that is included in the wireless data packet received from the registered device, and
  - said processor determines a registered device based on a unique identifier included in the wireless data packet by:
    - identifying a transmit frequency of the wireless data packet; and
    - comparing said transmit frequency to a network device list to determine if the frequency is associated with a registered device.

4. A main server for managing electronic devices comprising:
- a memory that stores software for managing network resources from a single point of administration;
- a receiver that receives wireless data packets from a plurality of wireless electronic devices; and
- a processor that determines a registered device among said plurality of wireless electronic devices and creates a wireless local area network (LAN) by wirelessly connecting the main server to said registered device, wherein said processor is further configured to manage said registered device using said software, and wherein said registered device comprises at least one of an appliance, an environmental control device, and an entertainment device, wherein:
  - said processor determines a registered device based on a unique identifier of the registered device that is included in the wireless data packet received from the registered device,
  - said processor determines a registered device based on a unique identifier included in the wireless data packet by:
    - identifying an encryption key included in the wireless data packet; and
    - comparing said encryption key to a network device list to determine if the encryption key is associated with a registered device.

5. A main server for managing electronic devices comprising:
- a memory that stores software for managing network resources from a single point of administration;
- a receiver that receives wireless data packets from a plurality of wireless electronic devices; and
- a processor that determines a registered device among said plurality of wireless electronic devices and creates a wireless local area network (LAN) by wirelessly connecting the main server to said registered device, wherein said processor is further configured to manage said registered device using said software, and wherein said registered device comprises at least one of an appliance, an environmental control device, and an entertainment device, wherein:
  - said processor manages said electronic devices by:
  - monitoring management initiating parameters for said electronic devices;
    - determining a management action to be performed on an electronic device to be managed based on said management initiating parameters; and
    - transmitting a management action data packet to said electronic device to be managed, and
    - said processor monitors management initiating parameters by monitoring at least one of a system clock and sensed parameters.

* * * * *